US011891215B2

(12) United States Patent
Tucker

(10) Patent No.: US 11,891,215 B2
(45) Date of Patent: Feb. 6, 2024

(54) REINFORCED THERMOPLASTIC BAG WITH EXTENDED HEM SKIRT

(71) Applicant: THE GLAD PRODUCTS COMPANY, Oakland, CA (US)

(72) Inventor: Edward B Tucker, Willowbrook, IL (US)

(73) Assignee: The Glad Products Company, Oakland, CA (US)

( * ) Notice: Subject to any disclaimer, the term of this patent is extended or adjusted under 35 U.S.C. 154(b) by 69 days.

(21) Appl. No.: 17/570,856

(22) Filed: Jan. 7, 2022

(65) Prior Publication Data

US 2022/0219865 A1 Jul. 14, 2022

Related U.S. Application Data

(60) Provisional application No. 63/136,307, filed on Jan. 12, 2021.

(51) Int. Cl.

| | |
|---|---|
| ***B65D 33/28*** | (2006.01) |
| ***B65D 33/02*** | (2006.01) |
| ***B31B 70/60*** | (2017.01) |
| ***B65D 65/40*** | (2006.01) |
| ***B31B 170/20*** | (2017.01) |
| ***B31B 155/00*** | (2017.01) |

(52) U.S. Cl.

CPC .............. *B65D 33/28* (2013.01); *B31B 70/60* (2017.08); *B65D 33/02* (2013.01); *B65D 65/40* (2013.01); *B31B 2155/00* (2017.08); *B31B 2170/20* (2017.08)

(58) Field of Classification Search

CPC .......... B65D 33/28; B65D 33/02; B31B 70/60

See application file for complete search history.

(56) References Cited

U.S. PATENT DOCUMENTS

| | | | | |
|---|---|---|---|---|
| 9,108,380 | B2 * | 8/2015 | Binger | B65D 33/28 |
| 2003/0142887 | A1 | 7/2003 | Sleight et al. | |

(Continued)

FOREIGN PATENT DOCUMENTS

| | | | |
|---|---|---|---|
| EP | 0953511 | A1 | 11/1999 |

OTHER PUBLICATIONS

International Search Report & Written Opinion as received in PCT/US2022/011599 dated Mar. 23, 2022.

*Primary Examiner* — Derek J Battisti

(74) *Attorney, Agent, or Firm* — Keller Preece PLLC

(57) ABSTRACT

The present disclosure relates to strata 2-ply drawstring trash bags implementing a J-flap extended hem to provide increased top-of-bag strength. In one or more embodiments, the J-flap extended hem includes a 2-ply web folded back on itself (e.g., during a hem folding operation to enclose the drawstring within a hem channel). In one or more implementations, a hem seal secures the 2-ply web to an inside surface of the trash bag. At least one ply of the 2-ply web fold-over extends past the hem seal and is additionally secured to the inside surface of the trash bag via one or more hem skirt seals. For reduced material consumption in certain embodiments, the J-flap extended hem of the present disclosure imparts added strength using only one ply of the 2-ply web fold-over. In some embodiments, at least one ply of the 2-ply web fold-over includes ring-rolled portions to add top-of-bag strength.

20 Claims, 12 Drawing Sheets

(56) References Cited

U.S. PATENT DOCUMENTS

| | | | | |
|---|---|---|---|---|
| 2013/0188889 | A1* | 7/2013 | Fraser | B65F 1/0006 383/37 |
| 2013/0202229 | A1* | 8/2013 | Broering | B65D 33/00 383/75 |
| 2014/0093193 | A1* | 4/2014 | Dais | B65D 33/007 383/65 |
| 2014/0093195 | A1* | 4/2014 | Dais | B65D 33/28 383/65 |
| 2017/0362023 | A1* | 12/2017 | Cobler | B65D 33/28 |
| 2018/0118415 | A1* | 5/2018 | Jean-Mary | B31B 70/8134 |
| 2019/0315567 | A1* | 10/2019 | Cobler | B32B 27/08 |
| 2020/0103383 | A1* | 4/2020 | Ferracane | G01N 31/225 |

* cited by examiner

REINFORCED THERMOPLASTIC BAG WITH EXTENDED HEM SKIRT

CROSS-REFERENCE TO RELATED APPLICATIONS

This application claims priority to and the benefit of U.S. Provisional Patent Application No. 63/136,307, filed on Jan. 12, 2021, which is incorporated herein by reference in its entirety.

BACKGROUND

Among their many applications, thermoplastic bags are used as liners in trash or refuse receptacles. Trash receptacles that employ such liners can be found at many locations from small household kitchen garbage cans to larger, multi-gallon drums located in public places and restaurants. Bags that are intended to be used as liners for such refuse containers are typically made from low-cost, pliable thermoplastic material. When the receptacle is full, the thermoplastic liner holding the trash can be removed for disposal and replaced with a new liner.

Increasing manufacturing costs for thermoplastic liners have led to a trending effort to decrease material use (e.g., by making thinner webs). As a result, some conventional thermoplastic liners are prone to tearing, ruptures, and other issues at the top of the bag. For example, when grasping a conventional thermoplastic liner by a top portion, a grasping hand (e.g., fingers) can puncture or overly stretch (leading to subsequent failure of) the thermoplastic liner. For instance, after fingers stretch a thermoplastic liner during a grasping motion, these overly stretched areas are further compromised (e.g., in some cases to the point of failure) when pulling or lifting a thermoplastic liner up and out of a trash receptacle. In turn, such compromising of the top of the bag can lead to trash spillage, require an adjusted/awkward carrying position or method, etc.

Additionally, or alternatively, for some conventional thermoplastic liners, the decrease in material consumption can also trigger undesirable visual connotations (e.g., that less material is used and therefore the thermoplastic liner must be weak or cheaply made). Regardless of actual material properties, these conventional thermoplastic liners can visually convey material properties indicative of low durability and usability.

BRIEF SUMMARY

Aspects of the present disclosure relate to a multi-layered reinforced thermoplastic bag with improved top-of-bag strength performance. In particular, one or more implementations of the reinforced thermoplastic bag include an extended hem skirt applied to a grab-zone where users grasp when lifting or carrying the reinforced thermoplastic bag. In these or other embodiments, an extended hem skirt is formed by extending one or more layers of the reinforced thermoplastic bag (e.g., an inner layer, an outer layer, or both) across the grab-zone. Furthermore, the extended hem skirt is optionally secured to the sidewalls via one or more seals. The extended hem skirt reinforces the thermoplastic bag and provides a stronger top-of-bag because the extended hem skirt distributes an applied load across an area impacted by stresses/strain from grasping fingers (e.g., during a grabbing motion to lift or carry).

In addition to the foregoing, a method for forming a reinforced thermoplastic bag may include non-continuously laminating portions and/or layers of the reinforced thermoplastic bag together. In one or more implementations, the extended hem skirt is non-continuously laminated to portions of the grab-zone of the reinforced thermoplastic bag. Examples of non-continuously lamination include adhesive bonding, ultrasonic bonding, thermal bonding, embossing, ring rolling, SELFing, applying a combination of pressure and tackifying agents embedded in one or more films, and combinations thereof. Further, the method can include joining respective side edges of first and second sidewalls to form a bag configuration. The method can additionally include forming a bottom fold or a closed bottom edge to join the first and second sidewalls at a bottom portion of the reinforced thermoplastic bag.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
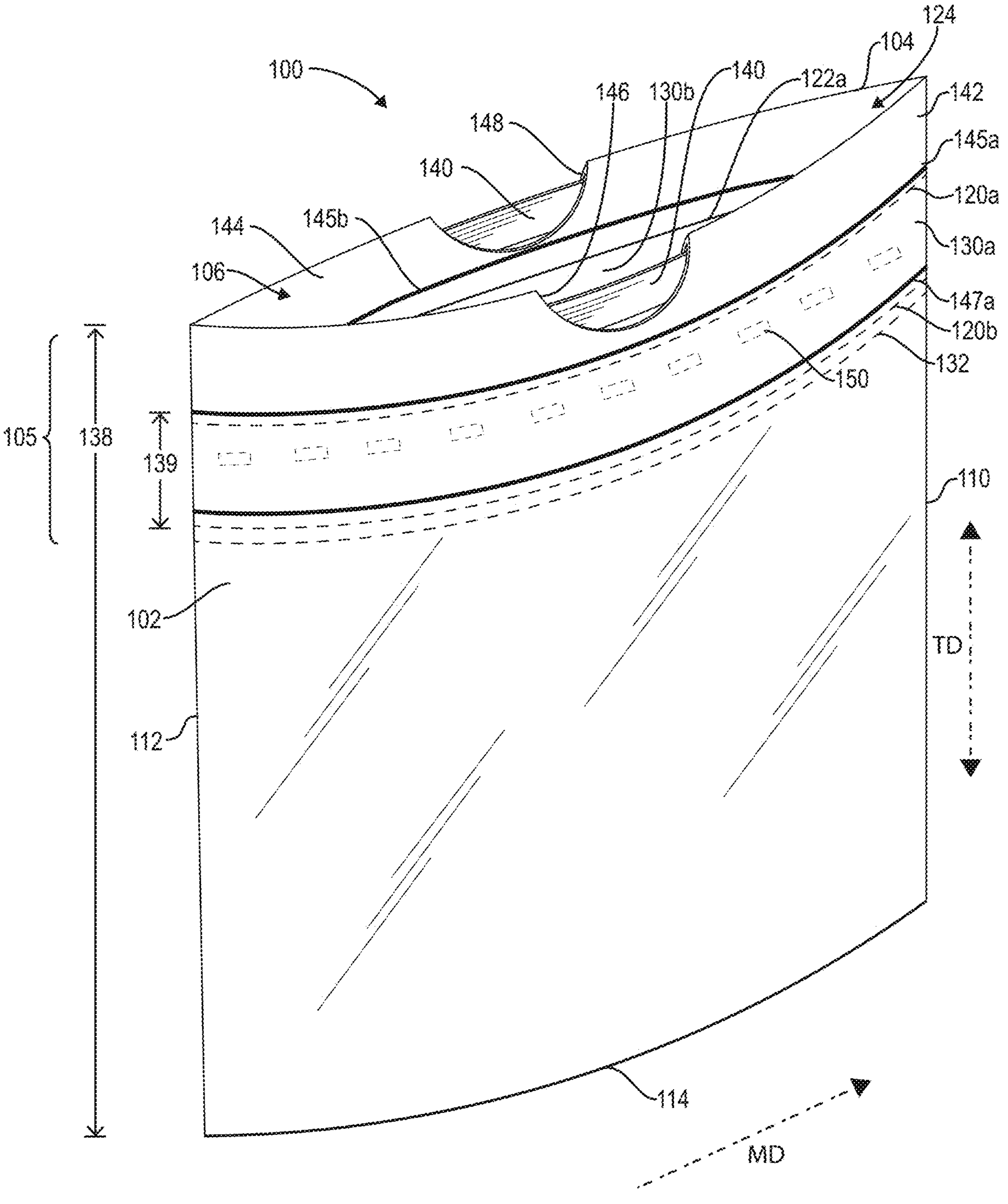
FIG. 1 illustrates a reinforced thermoplastic bag in accordance with one or more embodiments.

This disclosure describes one or more embodiments of a reinforced multi-layered thermoplastic bag with increased strength. In particular, the reinforced thermoplastic bag can include a multi-ply trash bag (e.g., the sidewalls include multiple plies) with a sidewall extension positioned across a grab-zone of the trash bag (e.g., areas of the trash bag commonly grabbed when removing the trash bag from a receptacle and in particular an area just below a hem seal). In these or other embodiments, the sidewall extension is a top portion of a sidewall doubled over itself and secured to an inner surface of the reinforced thermoplastic bag. For example, the sidewall extension is positioned between and is secured to the reinforced thermoplastic bag by discrete laminated portions (e.g., a hem seal and a hem skirt seal positioned below the hem seal). In one or more embodiments, the sidewall extension comprises multiple layers of a multi-layered sidewall folded over to an inner surface of the reinforced thermoplastic bag. In other embodiments, the sidewall extension comprises only one of multiple sidewall layers folded over to the inner surface of the reinforced thermoplastic bag.

To illustrate, the reinforced thermoplastic bag in one or more implementations utilizes an extended hem skirt of a first sidewall layer to reinforce a portion of the grab-zone extending below the hem skirt formed by a second sidewall layer. Utilizing an extended hem skirt comprising only one of two sidewall layers utilizes less material. In particular, rather than using both sidewall layers in the extended hem skirt, the reinforced thermoplastic bag can, in a more resource-friendly manner, provide additional reinforcing material at the grab-zone with just the one sidewall layer.

More particularly, the reinforced thermoplastic bag can include an extended hem skirt where either the first sidewall layer or the second sidewall layer extends past the hem skirt of the other sidewall layer. For example, in some embodiments, an outer sidewall layer of the reinforced thermoplastic bag forms the extended hem skirt that extends several inches past a hem skirt for an inner sidewall layer. In other embodiments, the inner sidewall layer of the reinforced thermoplastic bag forms the extended hem skirt by extending several inches past a hem skirt for the outer sidewall layer. By flexibly allowing either of the sidewall layers to form the extended hem skirt, the reinforced thermoplastic bag further increases manufacturing flexibility by allowing for the use of conventional bag making machines.

In one or more embodiments, the reinforced thermoplastic bag utilizes an extended hem skirt comprising both the first and second sidewall layers to reinforce the grab-zone. This approach also has at least a couple advantages. First, the reinforced thermoplastic bag can further increase (e.g., double) the amount of reinforcement applied at the grab-zone. By increasing the amount of reinforcement, the reinforced thermoplastic bag can better withstand applied loads from grasping fingers. Second, the reinforced thermoplastic bag can apply, via multiple sidewall layers, different (e.g., complimenting) material properties to the grab-zone of the reinforced thermoplastic bag. For example, a first sidewall layer may impart increased puncture toughness while a second sidewall layer may impart a directional strength improvement to the reinforced thermoplastic bag.

Additionally, or alternatively, in one or more embodiments, the reinforced thermoplastic bag utilizes an extended hem skirt comprising ring-rolled portions. By utilizing ring-rolled portions in the extended hem skirt, the reinforced thermoplastic bag can improve strength characteristics at the grab-zone. Furthermore, ring-rolling certain film portions allows the reinforced thermoplastic bag to be formed of down-gauged film to facilitate decreased manufacturing costs without sacrificing strength or durability.

Additionally, one or more embodiments include forming the extended hem skirt by ring-rolling a top edge for one or more sidewall layers to extend a hem skirt at least two or more inches towards a bottom fold past the hem seal. This approach also increases manufacturing friendliness in some embodiments. For instance, in certain embodiments where only one of multiple sidewall layers form the extended hem skirt, the disclosed reinforced thermoplastic bag avoids reconfiguring manufacturing assemblies to perform multiple/different hem-folding operations or extrusion processes for forming an extended hem skirt with one sidewall layer and a regular hem skirt with the other sidewall layer. Accordingly, one or more embodiments can advantageously extrude films equally, ring-roll one of the sidewall layers to form a corresponding extended width that will form the extended hem skirt, and subsequently perform a regular hem fold operation involving both sidewall layers at conversion.

Further, in one or more implementations, the extended hem skirt is colored or patterned to visually impart or increase a perception of strength and durability at the grab-zone of the reinforced thermoplastic bag. In these or other embodiments, one or more layers of the reinforced thermoplastic bag are translucent to facilitate visibility of the extended hem skirt through an outside surface and/or an inside surface of the reinforced thermoplastic bag. For example, when superimposing a translucent outer layer of reinforced thermoplastic bag over one or more colored portions for the extended hem skirt, the reinforced thermoplastic bag can visibly show that the grab-zone is a reinforced area. Alternatively, each of the sidewall layers can be colored so as to impart a different color at the grab-zone via the extended hem skirt providing one or more additional layers of material.

As illustrated by the foregoing discussion, the present disclosure utilizes a variety of terms to describe features and benefits of a reinforced thermoplastic bag. Additional detail is now provided regarding the meaning of these terms. For example, as used herein, the term "grab-zone" refers to a portion of a thermoplastic bag that is subjected to an applied load (e.g., a lifting force to lift or carry the thermoplastic bag). In particular, the grab-zone includes a top portion of a thermoplastic bag (e.g., above and/or below a hem seal). For example, the grab-zone extends from a first side edge to an opposing second side edge and from proximate (e.g., immediately adjacent to or within a threshold distance from) the top opening a first distance toward the bottom fold. As another example, the grab-zone extends from a first side edge to an opposing second side edge and from the hem seal a second distance (equivalent or different from the first distance) toward the bottom fold. As a further example, the grab-zone extends from a first side edge to an opposing second side edge and from the hem seal a third distance (equivalent or different from the first and second distances) to a hem skirt seal toward the bottom fold.

As used herein, the terms "lamination," "laminate," and "laminated film," refer to the process and resulting product made by bonding together two or more layers of film or other material. The term laminate is also inclusive of coextruded multilayer films comprising one or more tie layers. The term "bonding," when used in reference to bonding of multiple layers may be used interchangeably with "lamination" of the layers. As a verb, "laminate" means to affix or adhere (by means of, for example, adhesive bonding, pressure bonding (e.g., ring rolling, embossing, SELFing, bond forming due to tackifying agents in one or more of the films), ultrasonic bonding, corona lamination, and the like) two or more separately made film articles to one another so as to form a multi-layer structure. For example, a means of sealing in one or more implementations comprises application of heat and pressure to a sidewall comprising one or more layers (at least one of which includes an extended hem skirt). To illustrate a means of sealing, a system forming the disclosed reinforced thermoplastic bag may perform metal-metal embossing or rubber-metal embossing in one unit or two units close-coupled. In one or both cases, the system may pre-heat one or more films and/or preheat an outside surface of drive rolls. As a noun, "laminate" means a product produced by the affixing or adhering via one or more implementations described above.

In one or more implementations, the lamination or bonding between a bag and a reinforcing feature, such as the extended hem skirt of the present disclosure, may be non-continuous (i.e., discontinuous or partially discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film (or alternatively, random bonded areas broken up by random un-bonded areas). In one or more embodiments, the discontinuous lamination includes patterned lamination.

As similarly used herein, the terms "partially discontinuous bonding" or "partially discontinuous lamination" refer to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article. Alternatively, partially discontinuous lamination can include two or more layers substantially continuous in the height of the article but not continuous in the width of the article. More particularly, partially discontinuous lamination refers to lamination of two or more layers with repeating bonded patterns broken up by repeating unbounded areas in either the machine direction or the transverse direction. In one or more embodiments, the partially discontinuous lamination includes patterned lamination.

As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

As also used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces without integrity loss. Similarly, materials and structures that are flexible can conform to the shape of contacting objects without integrity loss. For example, a thermoplastic bag disclosed herein may include web materials which exhibit an "elastic-like" behavior in the direction of applied strain without the use of added traditional elastic. As used herein, the term "elastic-like" describes the behavior of web materials which when subjected to an applied strain, the web materials extend in the direction of the applied strain. When the applied strain is released, the web materials return, to a degree, to their pre-strained condition.

Film Materials

In one or more implementations, the bag and/or the extended hem skirt of the present disclosure comprise thermoplastic films. As an initial matter, one or more layers of such films can comprise any flexible or pliable material comprising a thermoplastic material and that can be formed or drawn into a web or film. Each individual film layer may itself include a single layer or multiple layers. Adjuncts may also be included, as desired (e.g., pigments, slip agents, anti-block agents, tackifiers, or combinations thereof). The thermoplastic material of the films of one or more implementations can include, but are not limited to, thermoplastic polyolefins, including polyethylene, polypropylene, and copolymers thereof. Besides ethylene and propylene, exemplary copolymer olefins include, but are not limited to, ethylene vinylacetate (EVA), ethylene methyl acrylate (EMA) and ethylene acrylic acid (EAA), or blends of such olefins. Various other suitable olefins and polyolefins will be apparent to one of skill in the art.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations thereof.

In at least one implementation of the present invention, the film can include linear low density polyethylene. The term "linear low density polyethylene" (LLDPE) as used herein is defined to mean a copolymer of ethylene and a minor amount of an alkene containing 4 to 10 carbon atoms. In addition, a LLDPE includes a density from about 0.910 to about 0.926 g/cm$^3$, and a melt index (MI) from about 0.5 to about 10. For example, one or more implementations of the present invention can use an octene co-monomer, solution phase LLDPE (MI=1.1; p=0.920). Additionally, other implementations of the present invention can use a gas phase LLDPE, which is a hexene gas phase LLDPE formulated with slip/AB (MI=1.0; p=0.920). One will appreciate that the present invention is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present invention.

One will appreciate in light of the disclosure herein that manufacturers may form the individual films or webs to be non-continuously bonded together so as to provide improved strength characteristics using a wide variety of techniques. For example, a manufacturer can form a precursor mix of the thermoplastic material including any optional additives. The manufacturer can then form the film(s) from the precursor mix using conventional flat extrusion, cast extrusion, or coextrusion to produce monolayer, bilayer, or multilayered films. In any case, the resulting film can be discontinuously bonded to another film at a later stage to provide the benefits associated with the present invention.

Alternative to conventional flat extrusion or cast extrusion processes, a manufacturer can form the films using other suitable processes, such as, a blown film process to produce monolayer, bilayer, or multilayered films. Such layers are subsequently discontinuously bonded with another film layer at a later stage. If desired for a given end use, the manufacturer can orient the films by trapped bubble, tenterframe, or other suitable processes. Additionally, the manufacturer can optionally anneal the films.

The extruder used in one or more implementations includes a conventional design using a die to provide the desired gauge. Some useful extruders are described in U.S. Pat. Nos. 4,814,135; 4,857,600; 5,076,988; 5,153,382; each of which are incorporated herein by reference in their entirety. Examples of various extruders that may be used in producing the films of the present invention include a single screw type modified with a blown film die, an air ring, and continuous take off equipment.

In one or more implementations, a manufacturer can use multiple extruders to supply different melt streams, which a feed block can order into different channels of a multichannel die. The multiple extruders can allow a manufacturer to form a multi-layered film with layers having different compositions. Such multi-layer film may later be non-continuously laminated with another layer of film to provide the benefits of the present invention.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

Additional detail will now be provided regarding a reinforced thermoplastic bag in relation to illustrative figures portraying example embodiments and implementations of the reinforced thermoplastic bag. For example, FIG. 1 illustrates a reinforced thermoplastic bag 100 in accordance with one or more embodiments. The reinforced thermoplastic bag 100 may be used as a liner for a garbage can or similar refuse container. The reinforced thermoplastic bag 100 can include a first thermoplastic sidewall 102 and an opposing second thermoplastic sidewall 104 which together provide an interior volume 106. The first and second thermoplastic sidewalls 102, 104 may be joined along a first side edge 110, an opposing second side edge 112, and a closed bottom edge 114. The closed bottom edge 114 may extend between the first and second side edges 110, 112. In one or more implementations the first and second thermoplastic sidewalls 102, 104 are joined along the first and second side edges 110, 112 and along the closed bottom edge 114 by any suitable process, such as heat sealing. In alternative implementations, the closed bottom edge 114, or one or more of the first and second side edges 110, 112 can comprise a fold.

At least a portion of the respective first and second thermoplastic sidewalls 102, 104 may remain un-joined to define an opening 124 located opposite the closed bottom edge 114. The opening 124 may be used to deposit items into the interior volume 106. Furthermore, the reinforced thermoplastic bag 100 may be placed into a trash receptacle. When placed in a trash receptacle, a top portion of the first and second thermoplastic sidewalls 102, 104 may be folded over the rim of the receptacle.

As additionally shown in FIG. 1, the first and second thermoplastic sidewalls 102, 104 are folded back into the interior volume 106. For example, the first thermoplastic sidewall 102 may be folded back and attached via a hem seal 145*a* to the interior surface of the first thermoplastic sidewall 102, thereby forming a first hem channel disposed within a first hem 142. Similarly, the second thermoplastic sidewall 104 may be folded back and attached via a hem seal 145*b* to the interior surface of the second thermoplastic sidewall 104, thereby forming a second hem channel disposed within a second hem 144.

In one or more implementations, the first and second hem channels accommodate a draw tape 140 to close or reduce the opening 124. For example, as shown by FIG. 1, the draw tape 140 extends loosely through the first and second hem channels of the respective first and second hems 142, 144. To access the draw tape 140, first and second notches 146, 148 may be disposed through the respective first and second hems 142, 144. Pulling the draw tape 140 through the notches 146, 148 will constrict the first and second hems 142, 144 thereby closing or reducing the opening 124. The draw tape closure may be used with any of the implementations of a reinforced thermoplastic bag described herein.

To strengthen the thermoplastic bag 100 (e.g., to reduce ruptures or punctures), the thermoplastic bag 100 may include a thermoplastic reinforcing feature positioned within a grab-zone 105 of the reinforced thermoplastic bag 100. In particular, FIG. 1 shows that the thermoplastic bag 100 includes extended hem skirts 130*a*, 130*b* (collectively, extended hem skirts 130) that cover at least a portion of the grab-zone 105. In these or other embodiments, the extended hem skirts 130 can comprise one or more layers of material (e.g., sidewall layer(s) of a thermoplastic film as described above) attached to the thermoplastic bag 100 within the grab-zone 105. FIGS. 2A-2G illustrate various embodiments of the extended hem skirts 130 and modes for attaching the extended hem skirts 130 to the reinforced thermoplastic bag 100. Additionally, or alternatively, in one or more embodiments, as shown in FIG. 1, the extended hem skirts 130*a*, 130*b* are non-continuously bonded (e.g., via a plurality of non-continuous bonds 150) to the respective first and second thermoplastic sidewalls 102, 104. Additionally, or alternatively, the extended hem skirts 130*a*, 130*b* are attached to the respective first and second thermoplastic sidewalls 102, 104 via side seals that join the first and second thermoplastic sidewalls 102, 104 along the first and second side edges 110, 112.

To form the respective extended hem skirts 130*a*, 130*b*, at least one of first top edges 120*a*, 120*b* for the first thermoplastic sidewall 102 and at least one of second top edges 122*a*, 122*b* (not shown) for the second thermoplastic sidewall 104 extend past the respective hem seals 145*a*, 145*b* toward the closed bottom edge 114. Specifically, at least one of the first top edges 120*a*, 120*b* and at least one of the second top edges 122*a*, 122*b* are secured to corresponding hem skirt seals 147*a*, 147*b* (not shown). Additionally, or alternatively, the first top edges 120*a*, 120*b* and/or the second top edges 122*a*, 122*b* can be attached to the thermoplastic bag 100 via side seals (e.g., at the first and second side edges 110, 112).

As shown in FIG. 1, the extended hem skirts 130*a*, 130*b* each comprise a single layer. To illustrate, forming the extended hem skirt 130*a* for the first thermoplastic sidewall 102 comprises securing the first top edge 120*b* to the inside surface of the first thermoplastic sidewall 102 via the first hem skirt seal 147*a*. The first hem skirt seal 147*a* is positioned below the hem seal 145*a*, which in this case secures the first top edge 120*a* to the inside surface of the first thermoplastic sidewall 102. Similarly, forming the extended hem skirt 130*b* comprises securing the second top edge 122*b* to the inside surface of the second thermoplastic sidewall 104 via the second hem skirt seal 147*b*. The second hem skirt seal 147*b* (although not shown in FIG. 1) is positioned below the hem seal 145*b*, which in this case secures the second top edge 122*a* to the inside surface of the second thermoplastic sidewall 104. In these or other embodiments, the first top edges 120*a*, 120*b* may be unjoined or unattached to the second top edges 122*a*, 122*b*.

In alternative embodiments, the extended hem skirts 130*a*, 130*b* can include multiple layers of the respective first and second thermoplastic sidewalls 102, 104. For example, both the first top edge 120*a* and the first top edge 120*b* for the first thermoplastic sidewall 102 are at least partially attached to the inside surface of the first thermoplastic sidewall 102 via the first hem skirt seal 147*a*. Similarly, in one or more embodiments, both the second top edge 122*a* and the second top edge 122*b* for the second thermoplastic sidewall 104 are at least partially attached to the inside surface of the second thermoplastic sidewall 104 via the second hem skirt seal 147*b*.

In alternative embodiments, the extended hem skirts 130*a*, 130*b* can include a single layer, but in a different configuration than presently illustrated in FIG. 1. To illustrate an example configuration opposite to what is depicted in FIG. 1, in one or more implementations, the extended hem skirt 130*a* may be formed by securing the first top edge 120*a* to the inside surface of the first thermoplastic sidewall 102 via the first hem skirt seal 147*a*. In such a case, the first top edge 120*b* does not substantially extend past the hem seal 145*a* where secured to the inside surface of the first thermoplastic sidewall 102. Likewise, in one or more implementations, the extended hem skirt 130*b* may be formed by securing the second top edge 122*a* to the inside surface of the second thermoplastic sidewall 104 via the second hem skirt seal 147*b*. Accordingly, in this example, the second top edge 122*b* does not substantially extend past the hem seal 145*b* where secured to the inside surface of the second thermoplastic sidewall 104.

Additionally, or alternatively, in one or more embodiments, multiple hem skirt seals may attach the extended hem skirts 130*a*, 130*b* to the respective first and second thermoplastic sidewalls 102, 104. For example, the reinforced thermoplastic bag 100 may include one or more additional hem skirt seals for the first thermoplastic sidewall 102 positioned between the hem seal 145*a* and the first hem skirt seal 147*a* that secures the extended hem skirt 130*a* to the inside surface of the first thermoplastic sidewall 102. As another example, the reinforced thermoplastic bag 100 may include one or more additional hem skirt seals for the first thermoplastic sidewall 102 positioned below the first hem skirt seal 147*a* (e.g., for securing the first top edge 120*b* to the inside surface of the first thermoplastic sidewall 102 at a position closer towards the closed bottom edge 114).

In one or more implementations, the grab-zone 105 for each of the first and second thermoplastic sidewalls span between an adjustable grab-zone boundary 132 and the tops of respective first and second hems 142, 144 (e.g., proximate the opening 124). In addition, the grab-zone 105 can span between the first and second side edges 110, 112. Accordingly, in one or more implementations the extended hem skirts 130 extend between the first and second side edges 110, 112 and coextensive with at least a portion of the grab-zone 105 (e.g., proximate the adjustable grab-zone boundary 132). In alternative implementations, the extended hem skirts 130 do not extend the entire length between the first and second side edges 110, 112 and/or do not span an entire height of the grab-zone 105. In any event, the extended hem skirts 130 may provide extra material in the grab-zone 105 of the thermoplastic bag 100 that may be more prone to failure.

To illustrate, the extended hem skirts 130 can extend across the first or second thermoplastic sidewalls 102, 104 a distance 139. As shown in FIG. 1, the distance 139 for the extended hem skirt 130*a* of the first thermoplastic sidewall 102 spans from the hem seal 145*a* to a position proximate the adjustable grab-zone boundary 132 at or below the first hem skirt seal 147*a*. In other embodiments, for instance, the distance 139 for the extended hem skirt 130*a* extends from just below the hem seal 145*a* (e.g., proximate to the first top edge 120*a*) to a position proximate the adjustable grab-zone boundary 132 at or below the first hem skirt seal 147*a*. Of course, in other embodiments involving longer extended hem skirts and/or multiple hem skirt seals, the distance 139 can extend farther (e.g., closer) towards the closed bottom edge 114.

In these or other embodiments, the extended hem skirt 130*b* can extend the same distance 139 along the second thermoplastic sidewall 104 as does the extended hem skirt 130*a* along the first thermoplastic sidewall 102. In alternative implementations, the extended hem skirts 130*a*, 130*b* can extend different distances along the first and second thermoplastic sidewalls 102, 104. In any event, the distance 139 in some cases is between approximately 5% and 25% of a height 138 of the reinforced thermoplastic bag 100, where the height 138 is measured from the closed bottom edge 114 to the opening 124. For example, in one or more implementations the extended hem skirts 130 extend approximately 20% of the height 138 of the reinforced thermoplastic bag 100.

In more detail, the distance 139 may have a first range of about 1 inch (2.54 cm) to about 10 inches (25.4 cm), a second range of about 3 inches (7.6 cm) to about 8 inches (20.3 cm), a third range of about 4 inches (10.2 cm) to about 6 inches (15.2 cm), a fourth range of about 10 inches (25.4 cm) to about 30 inches (76.2 cm). In one implementation, the distance 139 may be 5 inches (12.7 cm). In another implementation, the distance 139 may be shorter or longer than the examples listed above.

By comparison, the height 138 may have a first range of about 20 inches (50.8 cm) to about 48 inches (121.9 cm), a second range of about 23 inches (58.4 cm) to about 33 inches (83.8 cm), and a third range of about 26 inches (66 cm) to about 28 inches (71.1 cm). In one implementation, the height 138 may be 27.375 inches (69.5 cm). In alternative implementations, the height 138 may be shorter or longer than the examples listed above.

In one or more embodiments, each of the first and second thermoplastic sidewalls 102, 104 (including or excluding the extended hem skirts 130) can have a gauge or thickness (e.g., average distance between the major surfaces) between about 0.1 mils to about 10 mils, suitably from about 0.1 mils to about 4 mils, suitably in the range of about 0.1 mils to about 2 mils, suitably from about 0.1 mils to about 1.25 mils, suitably from about 0.9 mils to about 1.1 mils, suitably between about 0.2 mils to about 0.9 mils, and suitably between about 0.3 mils to about 0.7 mils. In these or other embodiments, the first and second thermoplastic sidewalls 102, 104 can have a greater thickness than the extended hem skirts 130. In alterative implementations, the first and second thermoplastic sidewalls 102, 104 and the extended hem skirts 130 are the same thickness. In yet further implementations, the extended hem skirts 130 can be thicker than the first and second thermoplastic sidewalls 102, 104.

Additionally, or alternatively, in one or more embodiments, each of the first and second thermoplastic sidewalls 102, 104 and the extended hem skirts 130 can have a uniform or consistent gauge. In alternative implementations, one or more of the first thermoplastic sidewall 102, the second thermoplastic sidewall 104, or the extended hem skirts 130 can be rough or uneven. Further, the gauge of one or more of the first thermoplastic sidewall 102, the second thermoplastic sidewall 104, and the extended hem skirts 130 need not be consistent or uniform. Thus, the gauge of one or more of the first thermoplastic sidewall 102, the second thermoplastic sidewall 104, or the extended hem skirts 130 can vary due to product design, manufacturing defects, tolerances, or other processing issues.

In these or other embodiments, one or more layers of the extended hem skirts 130 can include various thicknesses relative to each other. For example, as described more below in relation to first and second sidewalls layers of FIGS. 2A-2G forming an extended hem skirt, a first layer may be thicker than a second layer, and vice-versa. Alternatively, the first and second extended hem skirt layers are the same thickness.

In one or more implementations, one or more of the first thermoplastic sidewall 102, the second thermoplastic sidewall 104, and/or the extended hem skirts 130 are incrementally stretched. For example, in one or more implementations, one or more of the first thermoplastic sidewall 102, the second thermoplastic sidewall 104, and/or the extended hem skirts 130 are incrementally stretched by one or more of MD ring rolling, TD ring rolling, SELFing, or other methods described in NON-CONTINUOUSLY LAMINATED MULTI-LAYERED BAGS of U.S. patent application Ser. No. 13/273,384, filed on Oct. 14, 2011, the contents of which are expressly incorporated herein by reference. Incrementally stretching one or more of the first thermoplastic sidewall 102, the second thermoplastic sidewall 104, and/or the extended hem skirts 130 can increase or otherwise modify one or more of the tensile strength, tear resistance, impact resistance, or elasticity of the films (while also reducing the basis weight of the film).

The first thermoplastic sidewall 102, the second thermoplastic sidewall 104, and the extended hem skirts 130 can each comprise multiple films of thermoplastic material. In particular, the first thermoplastic sidewall 102, the second thermoplastic sidewall 104, and the extended hem skirts 130 can comprise any of the thermoplastic materials described above or combinations thereof. In one or more implementations, the first and second thermoplastic sidewalls 102, 104 can comprise the same thermoplastic material as the extended hem skirts 130. In alternative implementations, the extended hem skirts 130 can comprise a different material than the first and second thermoplastic sidewalls 102, 104. For example, the material of the extended hem skirts 130 may have a higher tensile strength, tear resistance, puncture resistance, elasticity, and/or abrasion resistance than the material of the first and second thermoplastic sidewalls 102, 104. Extended hem skirts 130 made of stronger and/or tougher material may help further protect the thermoplastic bag 100 against rupture and/or puncture.

In addition to the forgoing, in one or more implementations, the extended hem skirts 130 and/or other portions of the first and second thermoplastic sidewalls 102, 104 can comprise visual features, such as color. In some cases, the visual features of the extended hem skirts 130 and the first and second thermoplastic sidewalls 102, 104 comprise a same color. In alternative implementations, the visual features (e.g., colors) of the extended hem skirts 130 and the first and second thermoplastic sidewalls 102, 104 can differ. For example, in one or more implementations, the extended hem skirt 130*a* comprises one or more outer layers of the first thermoplastic sidewall 102 that includes a white, translucent thermoplastic material. In this example, one or more additional layers (e.g., a second inner ply) of the first thermoplastic sidewall 102 can comprise a pigmented (e.g., non-white or colored) material, such as a black material. The one or more additional layers of the first thermoplastic sidewall 102 comprising pigmented material may also be extended to form part of the extended hem skirts 130 (e.g., underneath the one or more outer translucent layers of the first thermoplastic sidewall 102).

In these or other embodiments, the areas of the reinforced thermoplastic bag 100 including the extended hem skirt 130*a* can appear gray when viewed from the inside and/or the outside of the reinforced thermoplastic bag 100. Thus, the differing color of the areas of the reinforced thermoplastic bag 100, including the extended hem skirt 130*a*, can serve to notify a consumer that such areas of the reinforced thermoplastic bag 100 are provided additional strength. For instance, when the reinforced thermoplastic bag 100 is placed inside a receptacle, an inside surface of the reinforced thermoplastic bag 100 is visible within the receptacle and/or as flipped over a top rim of the receptacle. In this configuration, the respective visual features (e.g., differing colors) of the layer(s) of the first thermoplastic sidewall 102 forming the extended hem skirt 130*a* and/or other layer(s) of the first thermoplastic sidewall 102 may provide a visual signal of increased strength/durability through an inside surface of the reinforced thermoplastic bag 100. Similarly, when the reinforced thermoplastic bag 100 is held or viewed outside of a receptacle, an outside surface of the reinforced thermoplastic bag 100 is visible. In certain embodiments, the respective visual features (e.g., differing colors) of the layer(s) of the first thermoplastic sidewall 102 forming the extended hem skirt 130*a* and/or other layer(s) of the first thermoplastic sidewall 102 may provide a visual signal of increased strength/durability through the outside surface of the reinforced thermoplastic bag 100.

Of course, the extended hem skirts 130, like the reinforced thermoplastic bag 100, can include numerous other material/visual properties. For example, in one or more implementations, the extended hem skirts 130 includes odor control additives, perfume additives, etc. to improve and/or reduce an amount of foul odor, particularly in the grab-zone 105 near the opening 124 of the reinforced thermoplastic bag 100. Additionally, in one or more embodiments, the reinforced thermoplastic bag 100 includes one or more patterned portions (e.g., a patterned hem seal, a patterned hem skirt seal, a patterned sidewall, a patterning of a plurality of non-continuous bonds 150, and/or a patterned extended hem skirt). The patterned portions (for instance, a cross-hatch pattern) can serve to notify a consumer that such areas of the reinforced thermoplastic bag 100 are provided additional strength.

As previously mentioned, the extended hem skirts 130 can be non-continuously laminated to the reinforced thermoplastic bag 100. For example, FIG. 1 illustrates that the reinforced thermoplastic bag 100 can comprise a plurality of non-continuous bonds 150 securing the extended hem skirt 130*a* to the reinforced thermoplastic bag 100. In particular, the plurality of non-continuous bonds 150 may include a plurality of discontinuous adhesive bonds. In alternative implementations, the plurality of non-continuous bonds 150 can comprise ultrasonic bonds or pressure bonds (e.g., bonds formed from one or more of ring rolling, SELFing, embossing, or including tackifying agents in one or more of the films). In addition, the plurality of non-continuous bonds 150 can have additional or alternative positional configurations or design patterns than illustrated according to FIG. 1. For example, the plurality of non-continuous bonds 150 in one or more implementations are positioned above the hem seals 145*a*, 145*b* in addition to (or alternatively to) the plurality of non-continuous bonds 150 positioned across the extended hem skirts 130.

In one or more implementations, the plurality of non-continuous bonds 150 can have a bond strength that is less than a weakest tear resistance of each of the reinforced thermoplastic bag 100 and the extended hem skirts 130. In this manner, the plurality of non-continuous bonds 150 can be designed to fail prior to failing of the reinforced thermoplastic bag 100 or the extended hem skirts 130. Indeed, one or more implementations include the plurality of non-continuous bonds 150 that release just prior to any localized tearing of the reinforced thermoplastic bag 100 or the extended hem skirts 130. For example, the plurality of non-continuous bonds 150 between the reinforced thermoplastic bag 100 and the extended hem skirt 130*a* can act to first absorb forces via breaking of the plurality of non-continuous bonds 150 prior to allowing that same force to cause failure of the reinforced thermoplastic bag 100 or the extended hem skirt 130*a*. In this manner, the plurality of non-continuous bonds 150 can provide increased strength to the reinforced thermoplastic bag 100.

This is beneficial as it has been found that thermoplastic films often exhibit strength characteristics that are approximately equal to the strength of the weakest layer. Providing relatively weak bonding between the reinforced thermoplastic bag 100 and the extended hem skirts 130 has surprisingly been found to greatly increase the strength provided by the extended hem skirts 130. As more explicitly covered in U.S. patent application Ser. No. 12/947,025 filed Nov. 16, 2010 and entitled DISCONTINUOUSLY LAMINATED FILM, incorporated by reference herein, the MD and TD tear values of non-continuously laminated films in accordance with one or more implementations can exhibit significantly improved strength properties, despite a reduced gauge. In particular, the individual values for the Dynatup, MD tear resistance, and TD tear resistance properties in non-continuously laminated films of one or more implementations are unexpectedly higher than the sum of the individual layers. Thus, the non-continuous lamination of the reinforced thermoplastic bag 100 and the extended hem skirts 130 can provide a synergistic effect.

More specifically, the TD tear resistance of the non-continuously laminated films can be greater than a sum of the TD tear resistance of the individual layers. Similarly, the MD tear resistance of the non-continuously laminated films can be greater than a sum of the MD tear resistance of the individual layers. Along related lines, the Dynatup peak load of the non-continuously laminated films can be greater than a sum of a Dynatup peak load of the individual layers. Thus, the non-continuously laminated films can provide a synergistic effect. In addition to the foregoing, one or more implementations of non-continuously laminated extended hem skirts 130 provide a reduction in basis weight (e.g., gauge by weight). In some cases, the reinforced thermoplastic bag 100 achieves a 50% reduction in basis weight at such areas while still providing enhanced strength parameters.

As mentioned above, a grab-zone reinforcement structure can reinforce one or more thermoplastic sidewalls, including one or more layers and/or distinct bags (e.g., for a bag-in-bag) of a reinforced thermoplastic bag. For example, FIGS. 2A-2G illustrate respective cross-sectional views of the upper portions of sidewalls 200*a*-200*g* including an extended hem skirt 206 in accordance with one or more embodiments. Opposing sidewalls to the sidewalls 200*a*-200*g* are omitted for clarity of illustration (as are portions of a reinforced thermoplastic bag below a grab-zone 220, such as the closed bottom edge 114 shown in FIG. 1). Additionally, as indicated at the top of each of FIGS. 2A-2G, the sidewalls 200*a*-200*g* illustrate the outside of a reinforced thermoplastic bag to the inside of a reinforced thermoplastic bag in a left-to-right direction.

Figure 2A:
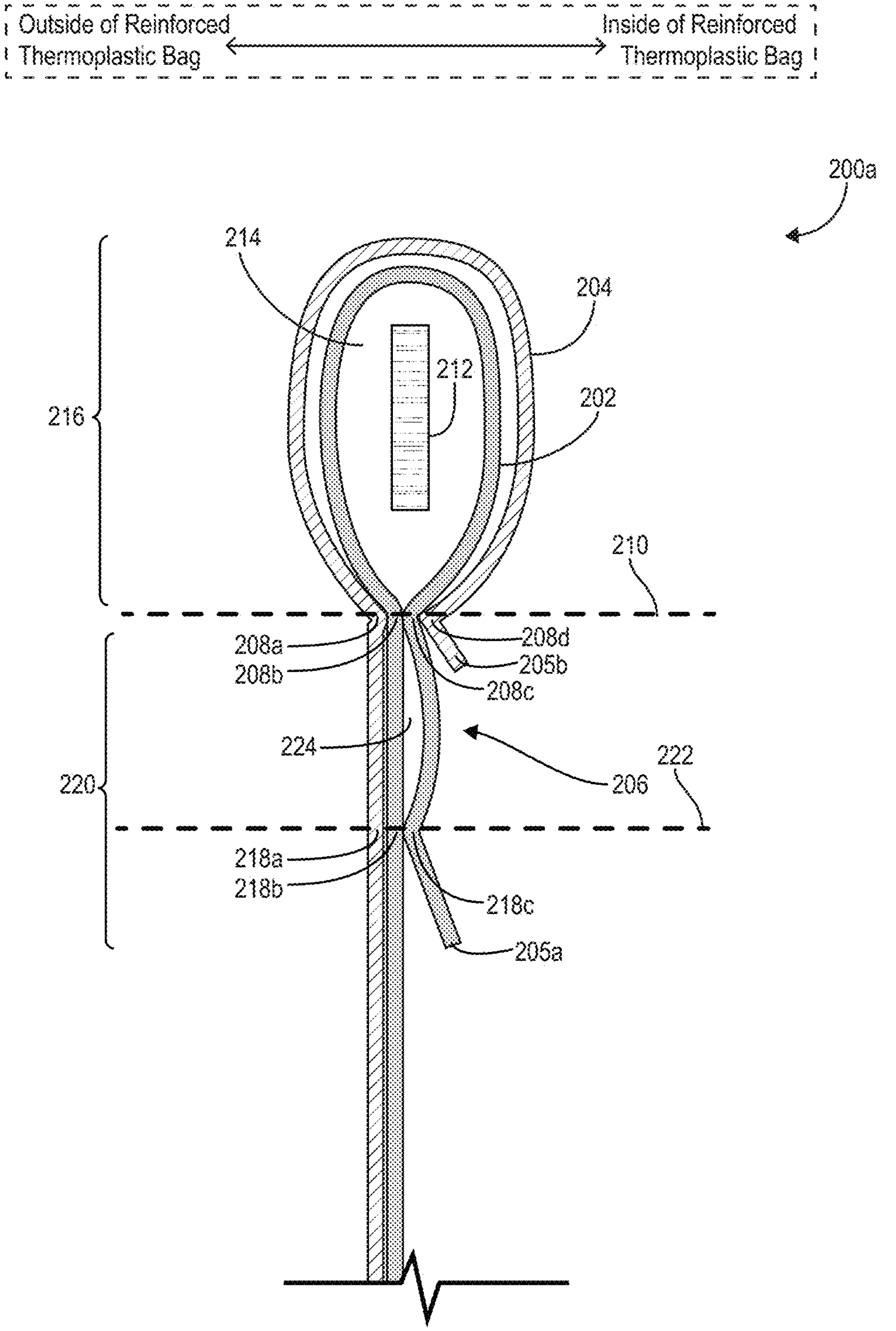
FIGS. 2A-2G illustrate respective cross-sectional views of various sidewalls implementing an extended hem skirt in accordance with one or more embodiments.
Figure 2B:
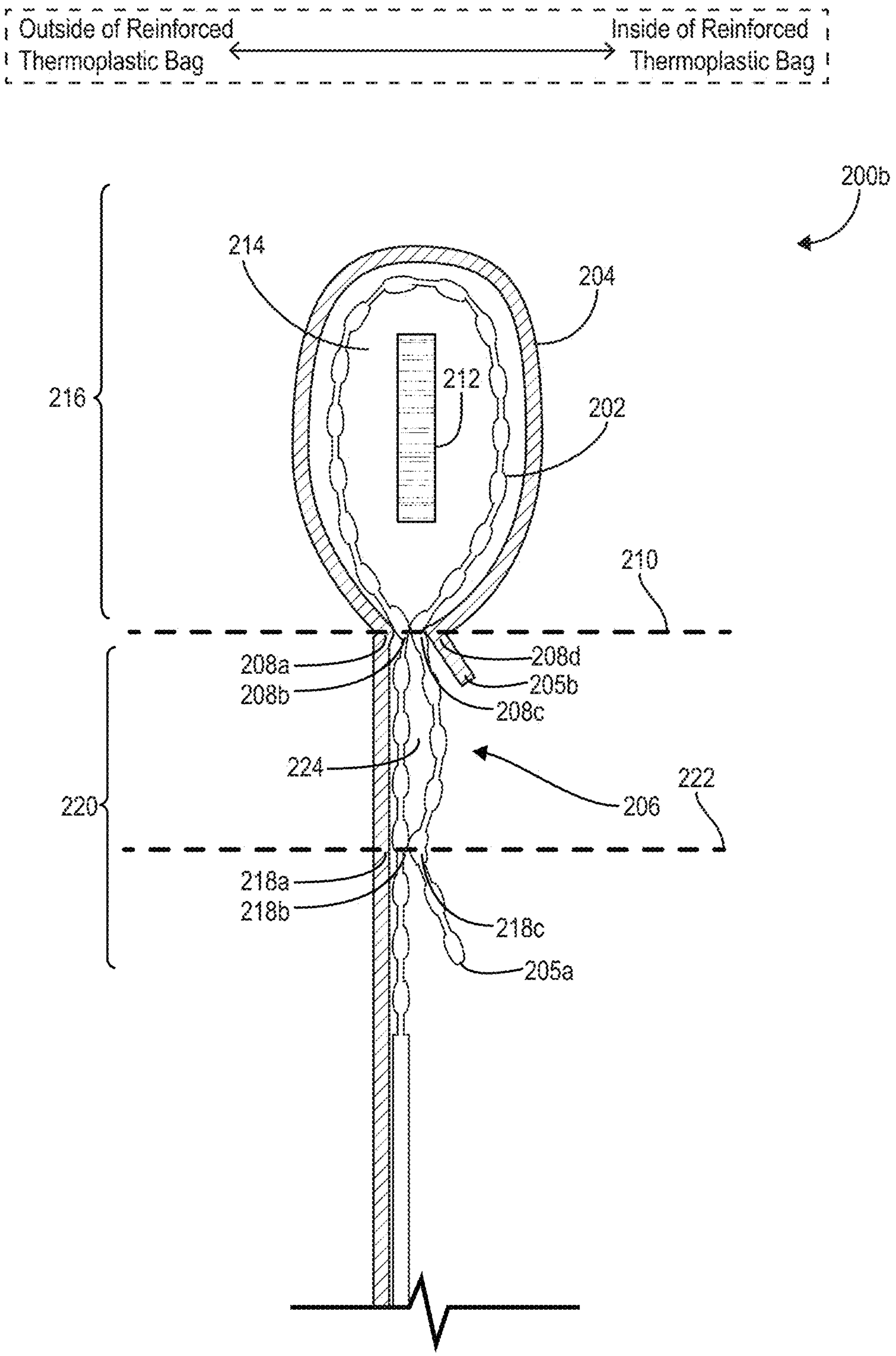
Figure 2C:
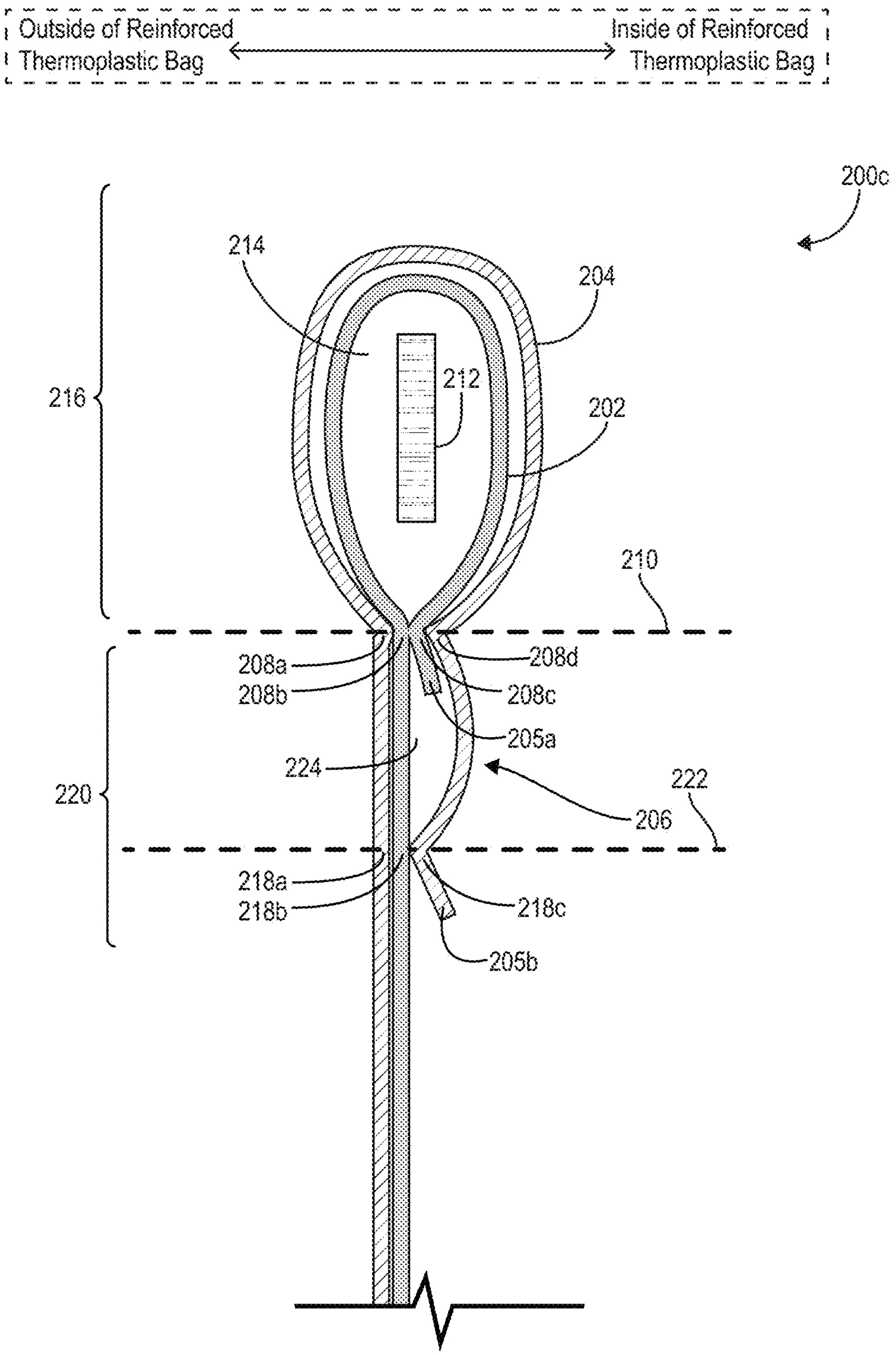
Figure 2D:
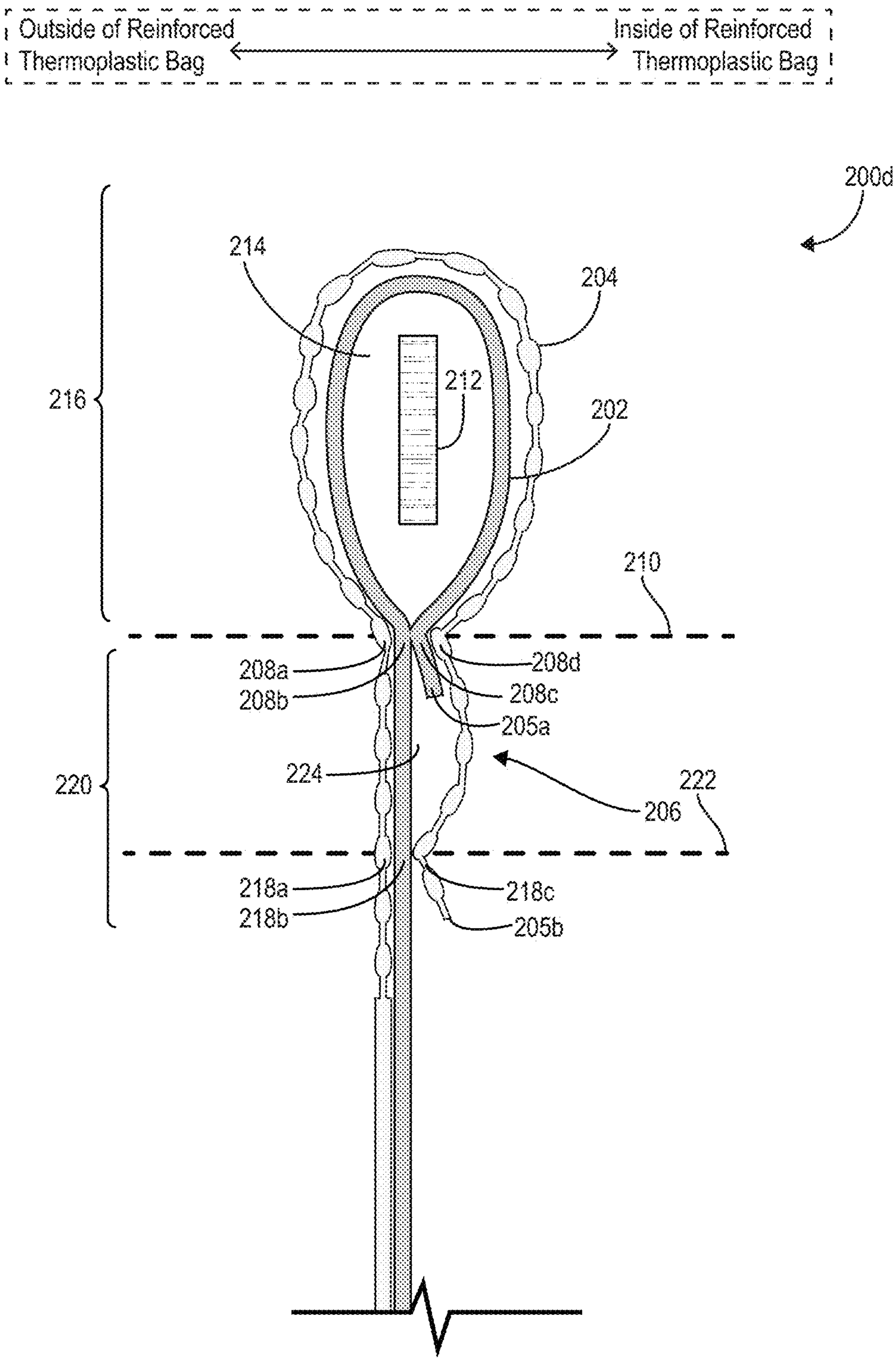
Figure 2E:
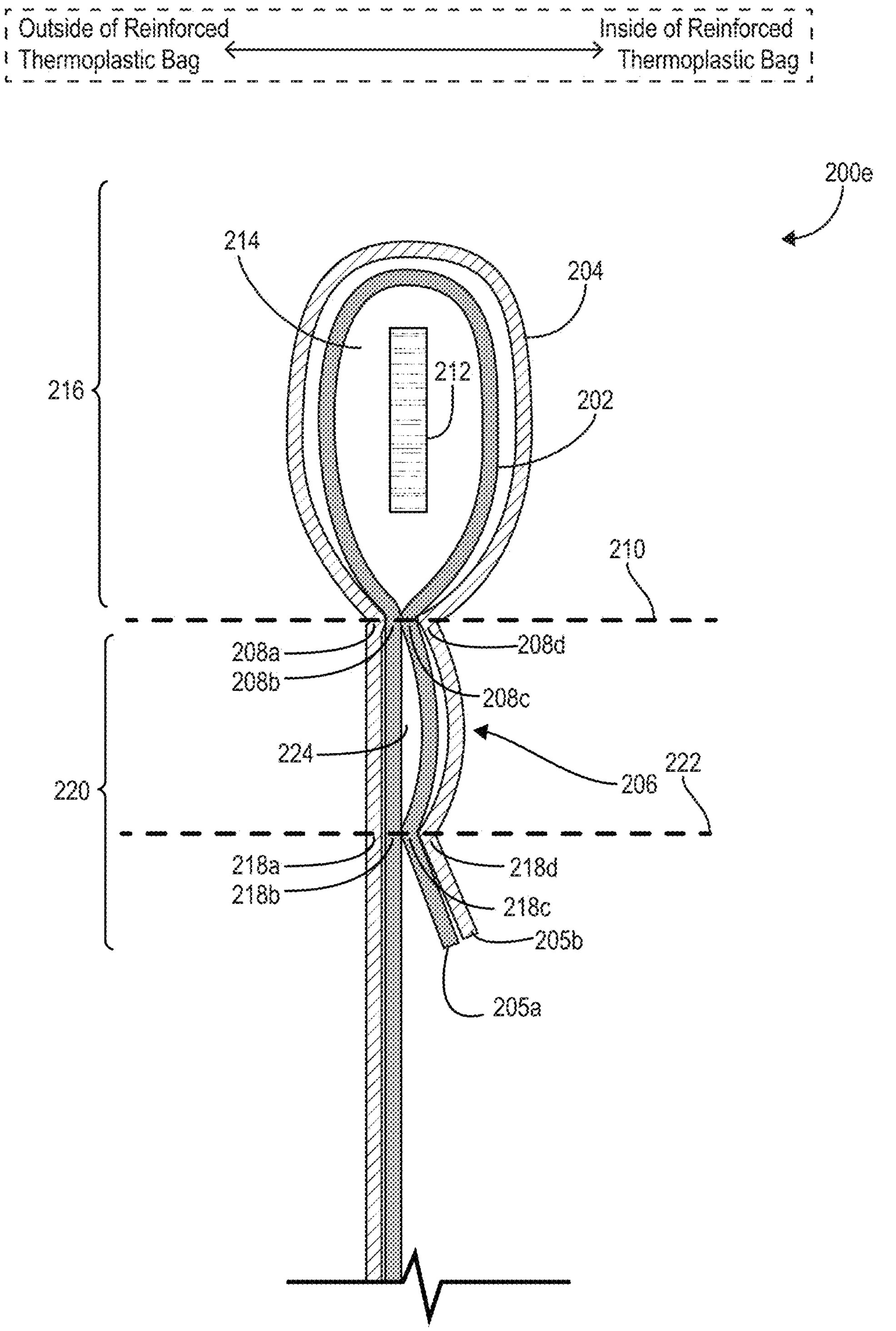
Figure 2F:
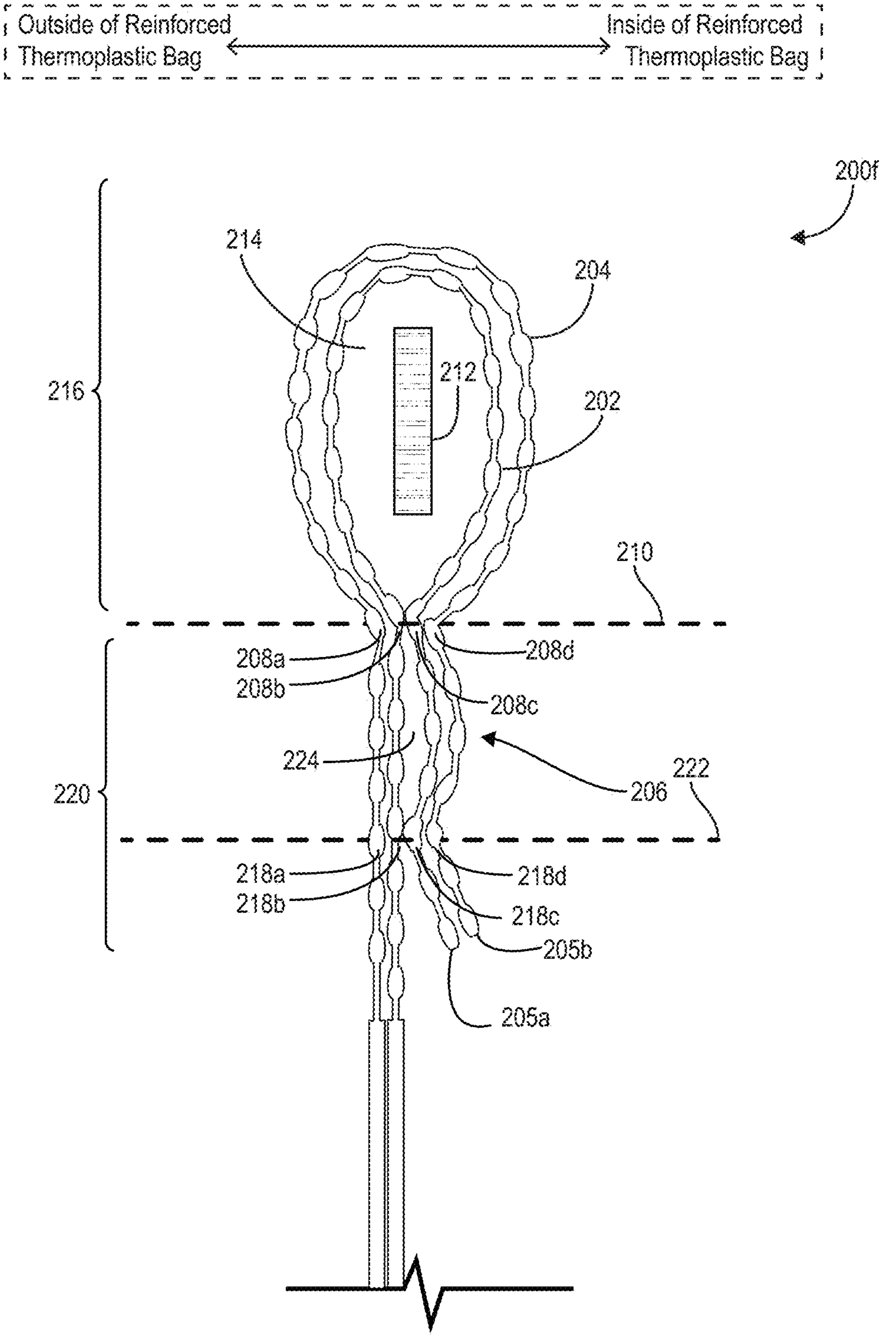
Figure 2G:
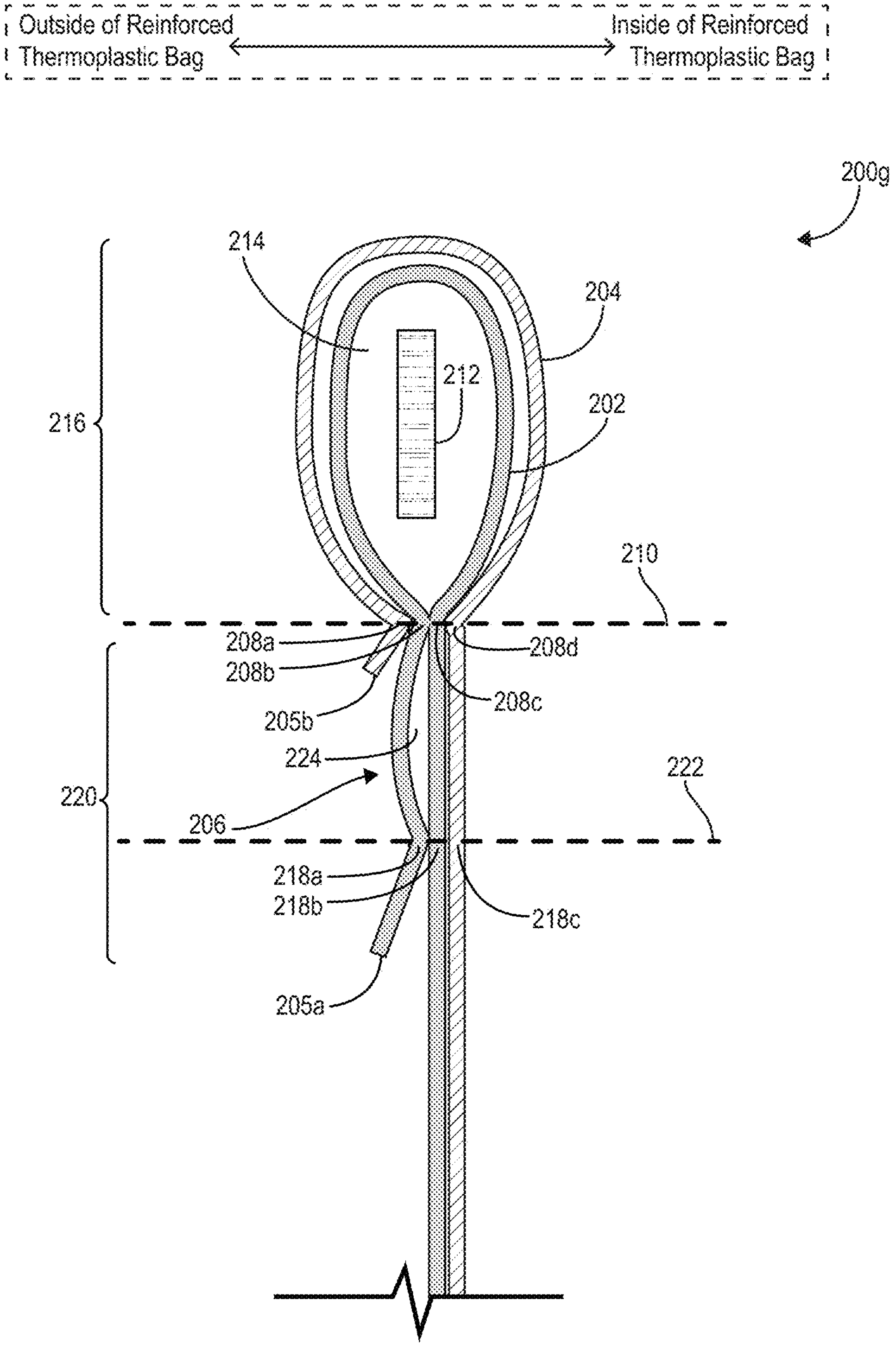

In particular, FIGS. 2A-2G illustrate a positional relationship between a first layer 202 and a second layer 204 of the sidewalls 200*a*-200*g* at a hem channel region 216 and the grab-zone 220. In one or more embodiments, the hem channel region 216 comprises a portion of the sidewalls 200*a*-200*g* above a hem seal 210. In contrast, the grab-zone 220 comprises another portion of the sidewalls 200*a*-200*g* extending below the hem seal 210 a distance toward a bottom fold (not shown). In particular, the hem seal 210 secures a fold-over of the first and second layers 202, 204 of the sidewalls 200*a*-200*f* to an inside surface of the reinforced thermoplastic bag, thereby forming a hem channel 214. In some cases, the hem seal 210 secures the fold-over of the first and second layers 202, 204 of the sidewalls 200*a*-200*f* to an outside surface of the reinforced thermoplastic bag to form the hem channel 214 (e.g., as shown in FIG. 2G). Disposed within the hem channel 214 includes a draw tape 212 (e.g., as a same or similar closing mechanism described above in relation to the draw tape 140 of FIG. 1).

For example, as shown for the hem channel region 216 of the sidewalls 200*a*-200*g*, the first layer 202 and the second layer 204 form the hem channel 214 by extending around the draw tape 212. Specifically, the first layer 202 extends around the draw tape 212 between attachment points 208*b*, 208*c* at the hem seal 210. In this case, the first layer 202 forms a first, innermost ply bounding the hem channel 214 such that the first layer 202 is positioned proximate to the draw tape 212 between attachment points 208*b*, 208*c* at the hem seal 210. In addition, the second layer 204 forms a second, outer ply bounding the hem channel 214 between attachment points 208*a*, 208*d* at the hem seal 210.

With respect to the grab-zone 220, the sidewalls 200*a*-200*g* comprise various configurations of the first and second layers 202, 204 forming the extended hem skirt 206, thereby imparting added strength and durability to the grab-zone 220. In one or more embodiments described below, one or both of the first layer 202 or the second layer 204 form the extended hem skirt 206 spanning at least from the hem seal 210 to a hem skirt seal 222 that secures the extended hem skirt 206 to the inside surface of the reinforced thermoplastic bag (or the outside surface of the reinforced thermoplastic bag as shown in FIG. 2G). That is, the hem skirt seal 222 secures at least one of a top edge 205*a* or a top edge 205*b* corresponding to the respective first and second layers 202, 204 folded over onto the inside or outside surface of the reinforced thermoplastic bag.

Additionally, or alternatively, at least a portion of the extended hem skirt 206 is secured to the inside or outside surface of the reinforced thermoplastic bag (e.g., via side seals and/or the plurality of non-continuous bonds 150 discussed above in relation to FIG. 1). Additionally, or alternatively, at least a portion of the extended hem skirt 206 is not secured to the inside or outside surface of the reinforced thermoplastic bag. For example, in one or more embodiments, securing at least one of the top edge 205*a* or the top edge 205*b* to the hem skirt seal 222 forms a hem channel 224 positioned between the hem seal 210 and the hem skirt seal 222. In these or other embodiments, the hem channel 224 is at least partially enclosed by the extended hem skirt 206 and either the inside surface or the outside surface of the first layer 202.

Turning specifically to the example embodiment in FIGS. 2A-2B, the sidewalls 200*a*-200*b* at the grab-zone 220 comprise the extended hem skirt 206 formed by the first layer 202 extending from the attachment point 208*c* at the hem seal 210 to attachment point 218*c* at the hem skirt seal 222. The top edge 205*a* of the first layer 202 extends below the hem skirt seal 222 that secures the top edge 205*a* to the inside surface of the first layer 202 at the attachment point 218*c*. The attachment point 218*c* is the innermost attachment point along the hem skirt seal 222 and is positioned proximate to attachment points 218*b*, 218*a* (in this order) at the hem skirt seal 222 for the respective first and second layers 202, 204. In contrast, the top edge 205*b* of the second layer 204 does not extend substantially past the hem seal 210 where the top edge 205*b* is secured to the inside surface of the first layer 202 at attachment point 208*d*. Accordingly, in one or more embodiments, the extended hem skirt 206 includes the first layer 202 but not the second layer 204.

In addition, as mentioned above, the first and second layers 202, 204 can comprise various thicknesses. In one or more implementations (e.g., for the sidewall 200*a*), the first layer 202 is thicker than the second layer 204 due to different amounts of extrusion.

In one or more implementations, the first layer 202 (e.g., as shown for the sidewall 200*b* of FIG. 2B) comprises ring-rolled portions at both the grab-zone 220 and the hem channel region 216. Of course, other embodiments of the sidewall 200*b* may include the first layer 202 comprising ring-rolled portions at only the grab-zone 220 or only the hem channel region 216. Additionally, or alternatively, one or more embodiments of the sidewall 200*b* may include the first layer 202 comprising ring-rolled portions at only inner or outer portions of the reinforced thermoplastic bag. Additionally, in one or more implementations, the ring-rolled portions of the first layer 202 comprise TD ring-rolling. Alternatively, the ring-rolled portions of the first layer 202 comprise MD ring-rolling for diagonal direction DD ring-rolling.

With respect to the sidewalls 200*c*-200*d* of FIGS. 2C-2D, the extended hem skirt 206 comprises the second layer 204 extending from the attachment point 208*d* at the hem seal 210 to attachment point 218*c* at the hem skirt seal 222. The top edge 205*b* of the second layer 204 extends below the hem skirt seal 222 that secures the top edge 205*b* to the inside surface of the first layer 202 at the attachment point 218*c*. Here, the attachment point 218*c* is the innermost attachment point along the hem skirt seal 222 and is positioned proximate to attachment points 218*b*, 218*a* (in this order) at the hem skirt seal 222 for the respective first and second layers 202, 204. In contrast, the top edge 205*a* of the first layer 202 does not extend substantially past the hem seal 210 where the top edge 205*a* is secured to the inside surface of the first layer 202 at attachment point 208*c*. Thus, different from FIGS. 2A-2B, the extended hem skirt 206 in one or more embodiments includes the second layer 204 but not the first layer 202.

Additionally, as mentioned above, the first and second layers 202, 204 can comprise various thicknesses. In one or more implementations (e.g., for the sidewall 200*c*), the second layer 204 is thicker than the first layer 202 due to different amounts of extrusion.

In one or more implementations, the second layer 204 (e.g., as shown for the sidewall 200*d* of FIG. 2D) comprises ring-rolled portions at both the grab-zone 220 and the hem channel region 216. Other embodiments of the sidewall 200*d* may include the second layer 204 comprising ring-rolled portions at only the grab-zone 220 or only the hem channel region 216. Additionally, or alternatively, one or more embodiments of the sidewall 200*d* may include the second layer 204 comprising ring-rolled portions at only inner or outer portions of the reinforced thermoplastic bag. Additionally, in one or more implementations, the ring-rolled portions of the second layer 204 comprise TD ring-rolling. Alternatively, the ring-rolled portions of the second layer 204 comprise MD ring-rolling.

FIGS. 2E-2F illustrates the sidewalls 200*e*-200*f* comprising the extended hem skirt 206 formed by both the first layer 202 and the second layer 204 extending from the respective attachment points 208*c*, 208*d* at the hem seal 210 to the corresponding attachment points 218*c*, 218*d* at the hem skirt seal 222. The top edges 205*a*, 205*b* of the first layer 202 and the second layer 204 extend below the hem skirt seal 222 that secures both the top edges 205*a*, 205*b* to the inside surface of the first layer 202 at the respective attachment points 218*c*, 218*d*. Accordingly, in one or more embodiments, the extended hem skirt 206 includes both the first layer 202 and the second layer 204.

In addition, as mentioned above, the first and second layers 202, 204 can comprise various thicknesses. In one or more implementations (e.g., for the sidewalls 200*e*, 200*f*), the first layer 202 has an equivalent (or substantially equivalent) amount of thickness as the second layer 204.

In one or more implementations, both the first and second layers 202, 204 (e.g., as shown for the sidewall 200*f* of FIG. 2F) comprises ring-rolled portions at both the grab-zone 220 and the hem channel region 216. Other embodiments of the sidewall 200*f* may include the first and second layers 202, 204 comprising ring-rolled portions at only the grab-zone 220 or only the hem channel region 216. Additionally, or alternatively, one or more embodiments of the sidewall 200*f* may include the first and second layers 202, 204 comprising ring-rolled portions at only inner or outer portions of the reinforced thermoplastic bag. Additionally, in one or more implementations, the ring-rolled portions of both the first and second layers 202, 204 comprise TD ring-rolling. Alternatively, the ring-rolled portions of both the first and second layers 202, 204 comprise MD ring-rolling.

With respect to the embodiment in FIG. 2G, the sidewall 200*g* at the grab-zone 220 comprises the extended hem skirt 206 formed on an outside surface of the reinforced thermoplastic bag. In particular, the extended hem skirt 206 is formed by the first layer 202 extending from the attachment point 208*b* at the hem seal 210 to attachment point 218*a* at the hem skirt seal 222. The top edge 205*a* of the first layer 202 extends below the hem skirt seal 222 that secures the top edge 205*a* to the outside surface of the first layer 202 at the attachment point 218*a*. The attachment point 218*a* is the outermost attachment point along the hem skirt seal 222 and is positioned proximate to attachment points 218*b*, 218*c* (in this order) at the hem skirt seal 222 for the respective first and second layers 202, 204. In contrast, the top edge 205*b* of the second layer 204 does not extend substantially past the hem seal 210 where the top edge 205*b* is secured to the outside surface of the first layer 202 at attachment point 208*b*. Accordingly, in one or more embodiments, the extended hem skirt 206 is formed on the outer surface of the reinforced thermoplastic bag and includes the first layer 202 but not the second layer 204.

Figure 3C:
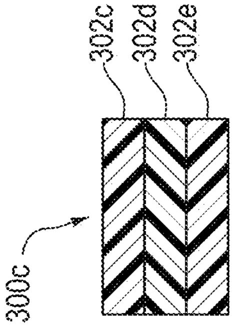
FIGS. 3A-3C illustrate individual films for use in a non-continuously laminated structure of thermoplastic films in accordance with one or more embodiments.
Figure 3B:
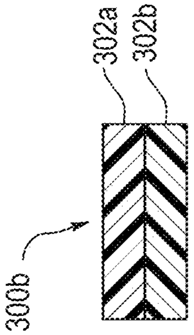
Figure 3A:
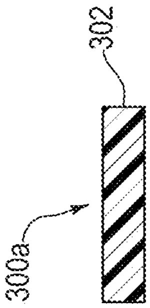

As mentioned above, each individual film layer of reinforced thermoplastic bag may itself include a single layer or multiple layers. For example, each of the first and/or second layers 202, 204 described above in relation to FIGS. 2A-2G can individually include a single layer or multiple layers. FIGS. 3A-3C illustrate individual films for use in a non-continuously laminated structure of thermoplastic films in accordance with one or more embodiments. In these or other embodiments, the films of FIGS. 3A-3C may include differing material compositions and functional material properties. In particular, FIG. 3A illustrates a film 300*a* of a single layer 302. In another implementation, as illustrated by FIG. 3B, a film 300*b* can have two layers (i.e., a bi-layered film). In particular, the film 300*b* can include a first layer 302*a* and a second layer 302*b*. The first and second layers 302*a*, 302*b* can optionally include different grades of thermoplastic material or include different additives, including polymer additives.

In still another implementation, shown in FIG. 3C, a film 300*c* can include three layers (i.e., a tri-layered film). For example, FIG. 3C illustrates that the film 300*c* can include a first layer 302*c*, a second layer 302*d*, and a third layer 302*e*. The film 300*c* (as a tri-layer film) can include an A:B:C configuration in which all three layers vary in one or more of gauge, composition, color, transparency, or other properties. Alternatively, the film 300*c* (as a tri-layer film) can comprise an A:A:B structure or an A:B:A structure in which two layers have the same composition, color, transparency, or other properties. In an A:A:B structure or A:B:A structure, the A layers can comprise the same gauge or differing gauge. For example, in an A:A:B structure or A:B:A structure, the films can comprise layer ratios of 20:20:60, 40:40:20, 15:70:15, 33:34:33, 20:60:20, 40:20:40, or other ratios.

Example control films include a three-layer B:A:B structure, where the ratio of layers can be 20:60:20. The exterior B layers (i.e., 302*c*, 302*e*) can comprise a mixture of hexene LLDPE of density 0.918, and metallocene LLDPE of density 0.920. The interior A core layer (302*d*) can comprise a mixture of hexene LLDPE of density 0.918, butene LLDPE of density 0.918, and reclaimed resin from trash bags.

In another example, the film 300*c* is a coextruded three-layer B:A:B structure where the ratio of layers is 15:70:15. The B:A:B structure can also optionally have a ratio of B:A that is greater than 20:60 or less than 15:70. In one or more implementations, the LLDPE can comprise greater than 50% of the overall thermoplastic material in the film 300*c*.

Figure 4:
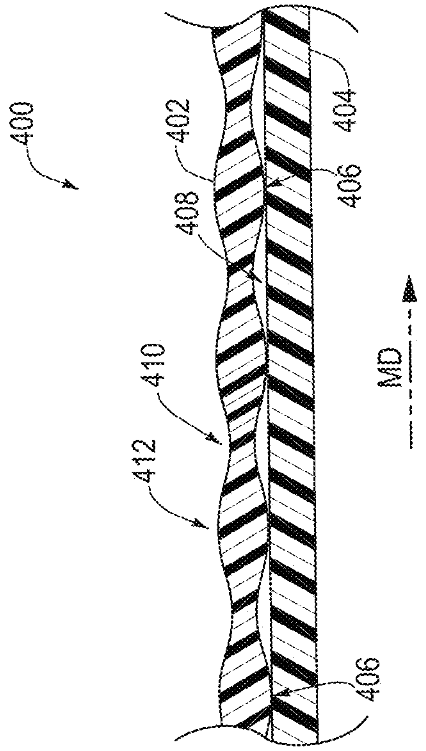
FIG. 4 illustrates a non-continuously laminated structure of thermoplastic films in accordance with one or more embodiments.

As just described, one or more implementations of a reinforced thermoplastic bag disclosed herein involve forming a non-continuously laminated structure of thermoplastic films with differing material compositions and functional material properties. For example, the reinforced thermoplastic bag of the present disclosure may include a plurality of films having different functional benefits provided by different material compositions. For instance, FIG. 4 illustrates a non-continuously laminated structure of thermoplastic films with differing material compositions and functional material properties in accordance with one or more embodiments. As shown in FIG. 4, the non-continuously laminated structure 400 with differing material compositions and functional material properties includes a first film 402 and second film 404. Each of the first and second films 402, 404 can comprise any of the films 300*a*-300*c* described above or a film with more than three layers.

The first film 402 comprise a film with a first material composition and the second film can comprise a second material composition that differs from the first material composition. For example, the first film 402 can comprise one of a control film, a scuff resistant film, a tough film, a stretchy film, an impact resistant film, a high tensile strength film, a film that provides a different functional benefit, or a film that provides a combination of the foregoing functional benefits. The second film 404 can comprise another (i.e., one differing from the first film 402) of a control film, a scuff resistant film, a tough film, a stretchy film, an impact resistant film, a high tensile strength film, a film that provides a different functional benefit, or a film that provides a combination of the foregoing functional benefits.

As mentioned above, the first and second films 402, 404 of the non-continuously laminated structure 400 can include thermoplastic films non-continuously bonded together. For example, FIG. 4 further illustrates that the first film 402 of the non-continuously laminated structure 400 is discontinuously bonded to the second film 404. In particular, the non-continuously laminated structure 400 can include bonds or bonded regions 406 and un-bonded regions 408. For example, FIG. 4 illustrates that the first and second films 402, 404 of the non-continuously laminated structure 400 are laminated together at the bonded regions 406. In addition, the bonded regions 406 are separated by the un-bonded regions 408 shown in FIG. 4 as gaps between the first and second films 402, 404.

In addition, the first and second films 402, 404 can be incrementally stretched (albeit FIG. 4 only illustrates the first film 402 as being incrementally stretched). For example, FIG. 4 illustrates that the first film 402 includes an alternating series of thinner webs 410 that comprise stretched (or more stretched) regions positioned adjacent to thicker ribs 412 that comprise un-stretched (or less stretched) regions. As explained in greater detail below, the manufacturer can incrementally stretch the first film 402 using one or more of ring rolling or SELFing.

In particular, FIG. 4 illustrates that the bonded regions 406 are aligned with and co-extensive with the thicker ribs 412. One will appreciate in light of the disclosure herein that the present invention is not so limited. For example, in alternative embodiments the bonded regions 406 are aligned with but not co-extensive with the thicker ribs 412. In still further embodiments, the bonded regions 406 may cross or otherwise interface with the thicker ribs 412 but may not be aligned with or co-extensive with the thicker ribs 412. In other embodiments, the bonded regions 406 may not interface with the thicker ribs 412.

Figure 5:
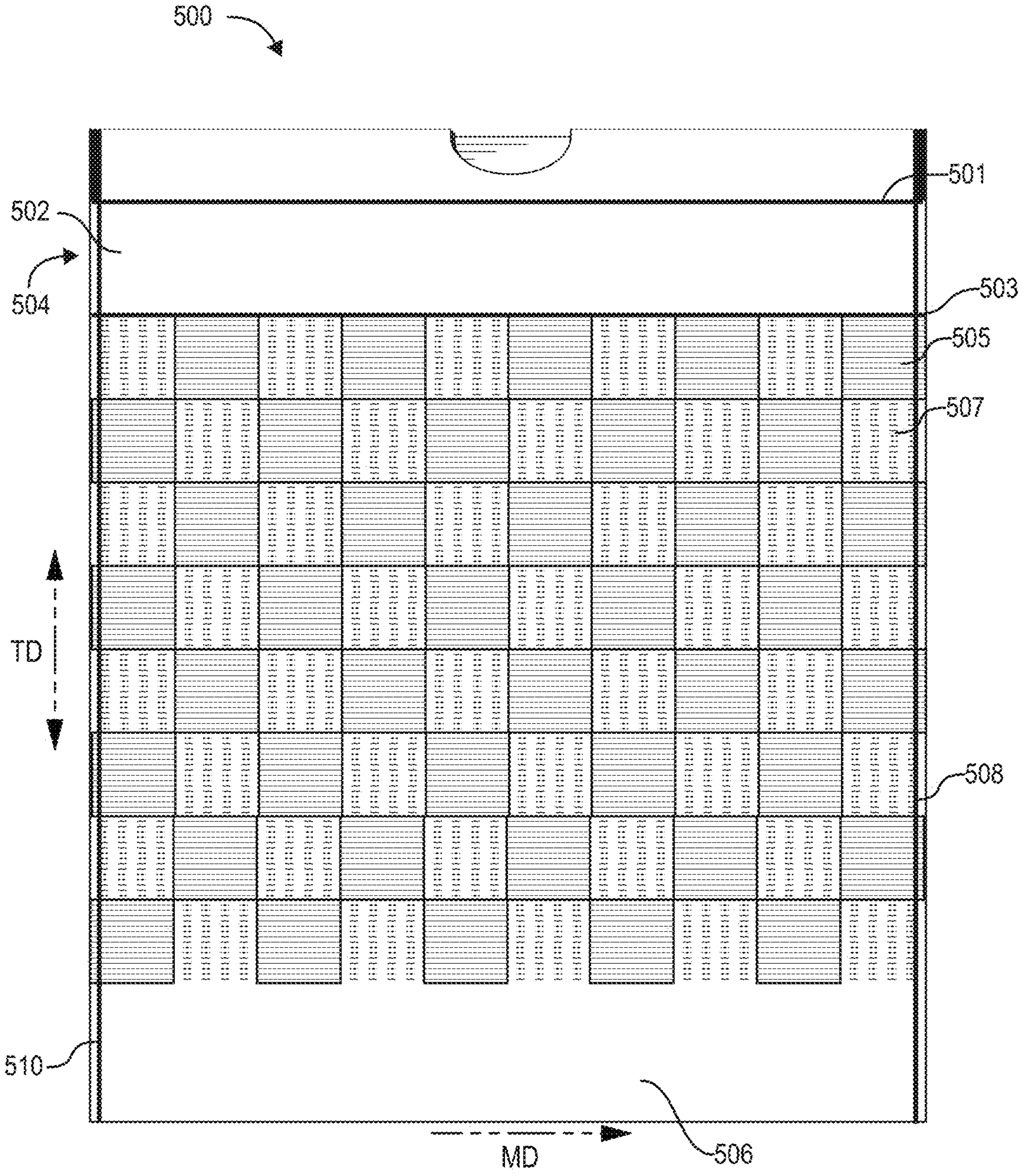
FIG. 5 illustrates another reinforced thermoplastic bag in accordance with one or more embodiments.

As mentioned above, the reinforced thermoplastic bag of the present disclosure can comprise portions that are (and are not) incrementally stretched and non-continuously bonded. FIG. 5 illustrates a reinforced thermoplastic bag 500 implementing an extended hem skirt 502 in accordance with one or more embodiments. For example, FIG. 5 illustrates the reinforced thermoplastic bag 500 comprising thermoplastic films with differing material compositions and functional material properties in which an upper portion 504 and a lower portion 506 are not incrementally stretched or non-continuously bonded. Thus, the upper portion 504 and the lower portion 506 can have an average gauge or thickness greater than the average gauge or thickness of the middle portion that comprises macro and micro bonding patterns 505, 507.

Additionally, or alternatively, the extended hem skirt 502 provides additional material at the upper portion 504 between a hem seal 501 and a hem skirt seal 503 (e.g., such that the average gauge or thickness of the upper portion 504 is greater than the middle portion and/or the lower portion 506). In these or other embodiments, the extended hem skirt 502 may be the same as or similar to the extended hem skirts 130 of FIG. 1 and/or the extended hem skirt 206 of FIGS. 2A-2G. In one or more embodiments, each of the upper portion 504 and the lower portion 506 is between 1/16$^{th}$ of an inch and 8 inches in height and extends in length from side seal 508 to side seal 510. In other embodiments, each of the upper portion 504 and the lower portion 506 is between 1 inch and 4 inches in height. In one or more embodiments, the heights of the upper portion 504 and the lower portion 506 are equal. In alternative embodiments, the heights of the upper portion 504 and the lower portion 506 are unequal.

Furthermore, as shown in FIG. 5, the hem skirt seal 503, in one or more embodiments, comprises a patterned seal. For example, in one or more embodiments, rather than a traditional heat seal, the hem skirt seal 503 comprises one or other mean for securing an end of the hem skirt 502 to the inner portion of the side wall. For example, the hem skirt seal 503 can comprise a pattern of contact areas, such as those described in PCT/US2020/24143, filed on Mar. 23, 2020, and hereby incorporated by reference in its entirety. In such embodiments, the pattern hem skirt seal 503 comprises a pattern of visually-distinct contact areas between the extended hem skirt 502 and the sidewall of the bag. The pattern of visually-distinct contact areas, when viewed from the first thermoplastic film side of the multi-film thermoplastic bag, has a second appearance differing from the unbonded portions of the extended hem skirt 502. Also, the pattern of visually-distinct contact areas is configured to separate before either of the first thermoplastic film or the second thermoplastic film fails when subjected to peel forces. Furthermore, portions of the extended hem 502 in the contact area are flat and un-deformed.

In alternative embodiments, the hem skirt seal 503 can comprise a cold deformed bonds such as those formed by ring rolling, SELFing, embossing, or the combination of pressure and tackifying agents embedded in one or more films. Additionally, the hem skirt seal 503 can comprise bonds formed via one or more of adhesive bonding, pressure bonding, ultrasonic bonding, corona lamination, and the like. In still further embodiments, the hem skirt seal 503 can comprise a pattern of discrete heat seals. In any event, in one or more embodiments, the hem skirt seal 503 can comprise a different bonding mechanism than the hem seal 501.

Figure 6:
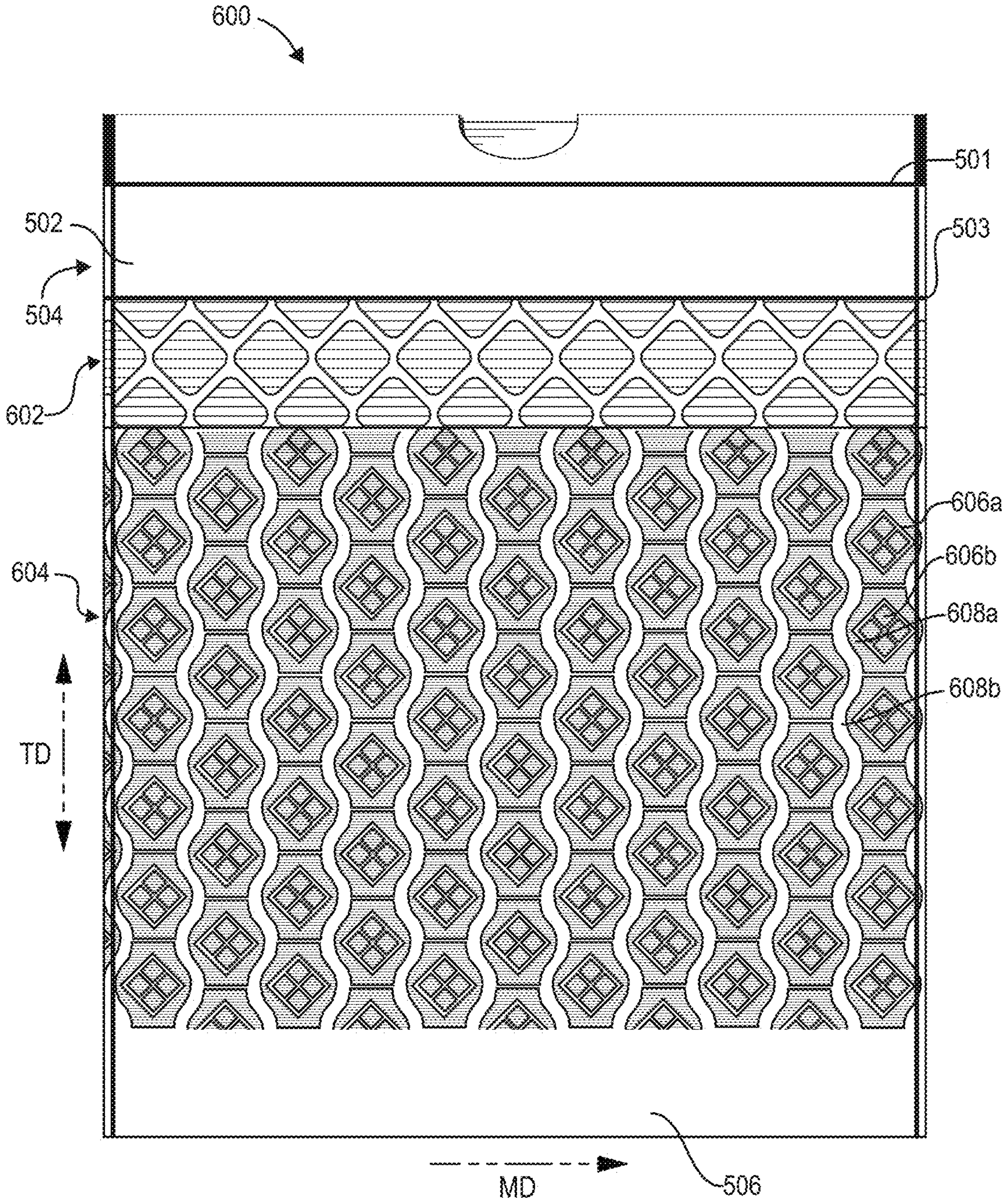
FIG. 6 illustrates yet another reinforced thermoplastic bag in accordance with one or more embodiments.

While FIG. 5 illustrates a reinforced thermoplastic bag with a single bonding pattern between the layers of the sidewalls, other implementations comprise multiple different bonding patterns. In particular, a manufacturer can tailor different areas of a bag with different properties by providing different areas of the bag with different bonding patterns between the films. For example, FIG. 6 illustrates a reinforced thermoplastic bag 600 implementing the extended hem skirt 502 in accordance with one or more embodiments. In these or other embodiments, the reinforced thermoplastic bag 600 of FIG. 6 comprises thermoplastic films with differing material compositions and functional material properties. In particular, the reinforced thermoplastic bag 600 comprises thermoplastic films arranged in a first bonding pattern (a fenced diamond pattern) in a first area 602 and a second bonding pattern (e.g., a bulbous pattern with nested diamonds) in a second area 604. Furthermore, as with the reinforced thermoplastic bag 500 of FIG. 5, the reinforced thermoplastic bag 600 includes the upper and lower portions 504, 506 devoid of bonding.

In one or more implementations, the reinforced thermoplastic bag 600 of FIG. 6 comprises the extended hem skirt 502 providing additional material at the upper portion 504 between the hem seal 501 and the hem skirt seal 503. For example, the extended hem skirt 502 provides additional material at the upper portion 504 such that the average gauge or thickness of the upper portion 504 is greater than the first area 602, the second area 604, and/or the lower portion 506.

As shown by FIG. 6, the sidewalls include a first plurality of raised rib-like elements 606*a* in a macro pattern (e.g., a bulbous pattern) and a second plurality of raised rib-like elements 606*b* in a micro pattern (e.g., four diamonds). As shown, the second plurality of raised rib-like elements 606*b* in the micro pattern are nested within the macro patterns. Furthermore, the reinforced thermoplastic bag 600 includes web areas 608*a*, 608*b*.

The fenced diamond pattern can comprise raised-rib-like elements arranged in diamond patterns where the intersections of the sides of the diamond are rounded rather than ending in corners. The fenced diamond pattern can also comprise web areas in which the first layer and the second layer are separate, discrete layers (e.g., within an individual layer) as described above.

As shown by FIG. 6, in one or more implementations, the hem skirt seal 503, which secures the end 505 of the hem seal 501 to the sidewall of the bag 600 can comprise bonds formed by the raised-rib-like elements arranged in diamond patterns securing the layers of the sidewall together in the first area 602. In other words, at the hem skirt seal 503, the first and second layers of the sidewall are secured to the end of the hem skirt 505 by the bonds of raised-rib-like elements arranged in diamond patterns. Furthermore, the pattern of raised-rib-like elements can extend below the extended hem skirt 501 and secure the layers of the sidewall together below the extended hem skirt 502.

One or more implementations of the present invention can also include methods of forming non-continuously laminated bags of thermoplastic films with extended hem skirts. In accordance with one or more embodiments, FIG. 7 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

One or more implementations of the present invention can also include methods of forming non-continuously laminated bags of thermoplastic films with extended hem skirts. In accordance with one or more embodiments, a process 700 in FIG. 7 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

Figure 7:
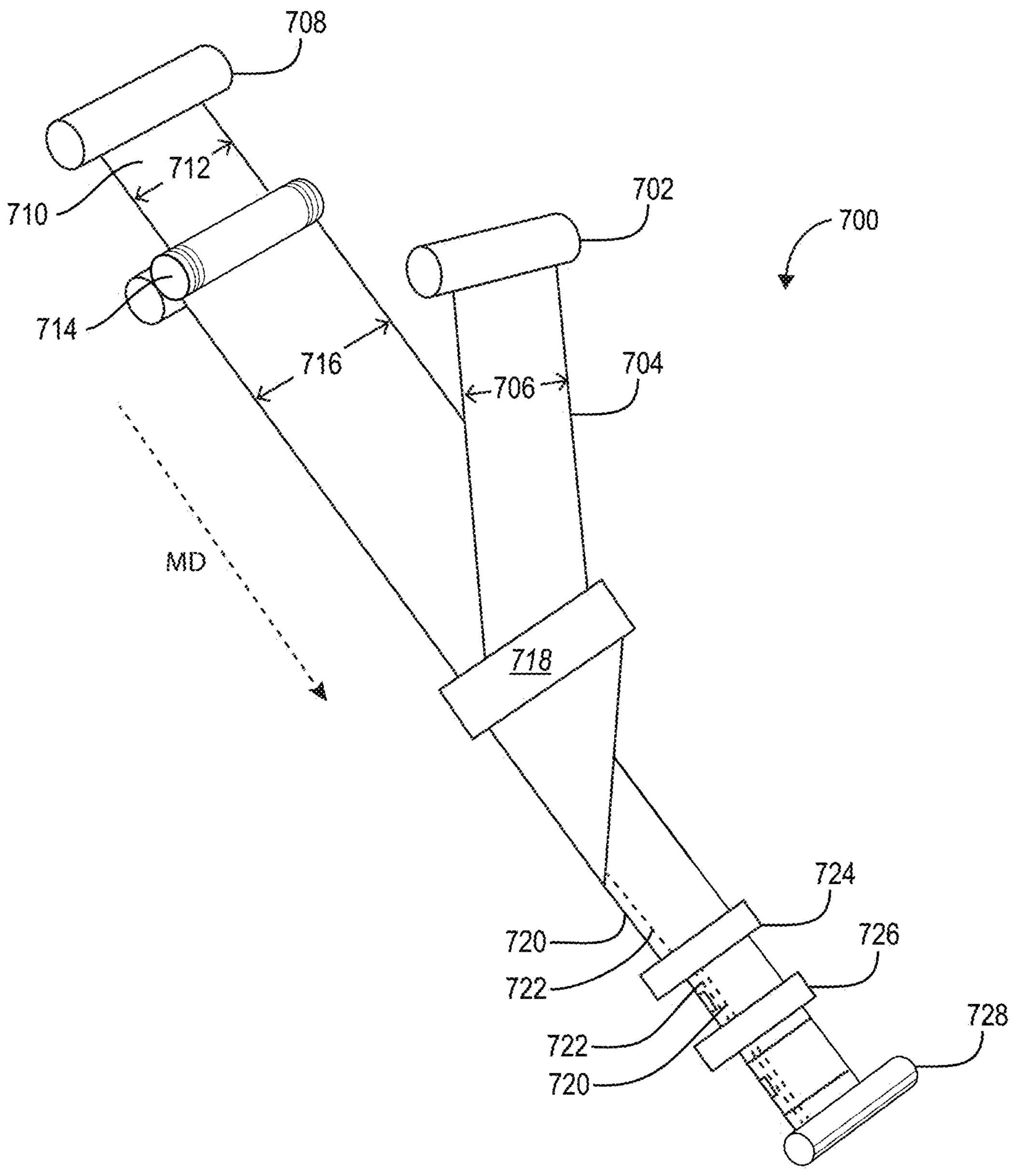
FIG. 7 illustrates an example manufacturing process for forming a reinforced thermoplastic bag in accordance with one or more embodiments.

As shown for the process 700 in FIG. 7, production may begin by unwinding a first continuous web or film 704 of a first thermoplastic material from a roll 702 and advancing the film 704 along a machine direction. The film 704 may have a width 706 that is perpendicular to the machine direction. In other manufacturing environments, the film 704 may be provided in other forms or even extruded directly from a thermoplastic forming process.

Additionally shown, the process 700 includes unwinding a second continuous web or film 710 of a second thermoplastic material from a roll 708 and advancing the film 710 along a machine direction. In some embodiments, the second thermoplastic material of the film 710 is the same as or similar to the first thermoplastic material of the film 704. In other embodiments, the films 704, 710 comprise different material compositions and/or different material properties (whether functional and/or aesthetic).

Prior to advancing the film 710 through ring-rollers 714, the film 710 comprises an initial width 712. After performing a ring-rolling operation via the ring-rollers 714, the film 710 comprises a width 716. The width 716 is greater than the initial width 712 because the ring-rollers 714 incrementally stretch portions of the film 710 (e.g., portions that subsequently become top edges for a sidewall layer in the reinforced thermoplastic bag). In one or more embodiments, the width 716 is, relative to the initial width 712, about two inches greater, about four inches greater, about six inches greater, about ten inches greater, or another suitable width increase.

In one or more implementations, the ring-rollers 714 are intermeshing rollers comprising a particular design to impart a bonding pattern (e.g., as described in relation to the foregoing figures). In this case, the ring-rollers 714 comprise intermeshing portions at opposing ends of the ring-rollers 714 separated by a flat middle portion. To facilitate a bonding pattern, the ring-rollers 714 may be forced or directed against each other by, for example, hydraulic actuators. The pressure at which the ring-rollers 714 are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

After the ring-rolling operation performed on the film 710, both the film 710 and the film 704 are fed into a folding mechanism for performing a folding operation 718. At the folding operation 718, the films 704, 710 are folded (e.g., in half) to form a bottom fold and both multi-layered sidewalls of a reinforced thermoplastic bag. As shown in FIG. 7, one multi-layered sidewall of the reinforced thermoplastic bag includes a top edge 720 corresponding to the film 710 and a top edge 722 corresponding to the film 704. The top edge 722 is dashed to indicate that the film 704 is made an inner layer of the reinforced thermoplastic bag after the folding operation 718. In addition, the opposing sidewall (not shown) includes a same or similar configuration.

At operation 724, a hem fold is performed where top edges for each multi-layered sidewall are folded onto corresponding interior surfaces of the reinforced thermoplastic bag, thereby forming a hem channel and encasing a draw tape. Accordingly, a width of the reinforced thermoplastic bag is reduced as a result of the hem-folding. To illustrate, FIG. 7 shows the top edges 720, 722 are folded inward onto interior surfaces of the reinforced thermoplastic bag. Once folded, the top edge 720 for the film 710 extends (e.g., several inches) past the top edge 722 for the film 704.

Additionally, at operation 724, one or more hem seals secure the top edges 720, 722 as folded over. In particular, a hem seal closes the hem channel with the draw tape disposed therein. In so doing, the hem seal affixes both the top edges 720, 722 to the interior surface of the reinforced thermoplastic bag. Extending out from the hem seal, a portion of the top edge 722 forms a hem skirt of about ¼ inch, about ½ inch, about 1 inch, or about 2 inches in length. Below the end of the hem skirt (e.g., towards the bottom fold), a hem skirt seal affixes the top edge 720 for the film 710 to the interior surface of the reinforced thermoplastic bag. In this manner, an extended hem skirt is formed by the top edge 720 extending (e.g., several inches, such as three to seven inches) past the hem skirt formed by the top edge 722.

In these or other embodiments, the hem seal and the hem skirt seal may be formed via one or more of adhesive bonding, pressure bonding, a combination of pressure with tackifying agents embedded in one or more films, ultrasonic bonding, corona lamination, and the like. In addition, albeit not required, multiple hem skirt seals may be formed (e.g., depending on the desired length of the extended hem skirt). Further, in some embodiments, the hem skirt seal(s) and/or the hem seal may be formed according to a particular pattern or aesthetic design configuration (e.g., to help visually indicate reinforcement to the grab-zone).

At operation 726, the side seals are created perpendicular to the machine direction in a same or similar manner as done for producing the hem seal and hem skirt seal(s)). In particular, the side seals join together the multi-layered sidewalls comprising the films 704, 710. In one or more implementations, the side seals also secure the hem skirt and extended hem skirt formed by the respective top edges 722, 720.

Subsequently, the reinforced thermoplastic bags can be wound into a roll 728 for packaging and distribution. In these or other embodiments, the reinforced thermoplastic bags can be perforated for (e.g., via a perforating device) to facilitate easier separation of the reinforced thermoplastic bags. Additionally, or alternatively, the reinforced thermoplastic bag can be completely separated by a cutting device and wound in an interleaved fashion into the roll 728 for packaging and distribution.

Modifications, additions, or omissions may be made to the embodiments illustrated and described in relation to the figures without departing from the scope of the present disclosure. For example, in one or more embodiments, additional or alternative thermoplastic films, extended hem skirt layers, hem skirt seals, etc. are implemented in any suitable configuration, among other different embodiments than may be explicitly illustrated or described. Furthermore, in some embodiments, both top edges of the films are ring-rolled as opposed to just one film as illustrated in FIG. 7. In other embodiments, none of the films are ring-rolled. Similarly, additional or alternative processes may be performed, such as non-continuous lamination processes involving adhesive bonding, ultrasonic bonding, thermal bonding, embossing, ring rolling, SELFing, pressure bonding in combination with tackifying agents embedded in at least one of the first or second thermoplastic films, and combinations thereof.

Additionally, or alternatively, albeit not shown in FIG. 7, the films 704, 710 can be extruded in a variety of ways (e.g., prior to winding or after unwinding the rolls 702, 708). In some embodiments, the films 704, 710 are extruded to have equal widths. In other embodiments, one of films 704, 710 is extruded to have a greater film width than the other. In some cases, one of the films 704, 710 may be subsequently ring-rolled to match the film width of the other film or to exceed the film width of the other film. Accordingly, numerous suitable combinations of manufacturing the films 704, 710 for use the reinforced thermoplastic bag are herein contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A reinforced thermoplastic bag comprising:

a first multi-layered sidewall of a thermoplastic material comprising a first side edge, an opposing second side edge, and a first hem seal creating a first hem channel by securing a fold-over of the first multi-layered sidewall to an inner surface of the first multi-layered sidewall;

a second multi-layered sidewall of the thermoplastic material comprising a first side edge, an opposing second side edge, and a second hem seal creating a second hem channel by securing a fold-over of the second multi-layered sidewall to an inner surface of the second multi-layered sidewall;

a top opening formed by the first and second multi-layered sidewalls, wherein:

the second multi-layered sidewall is connected to the first multi-layered sidewall at a bottom fold;

the first and second multi-layered sidewalls each comprise a grab-zone extending from the first side edges to the opposing second side edges and from the corresponding first and second hem seals a first distance toward the bottom fold; and at least a portion of the fold-over of the first multi-layered sidewall extends, within the reinforced thermoplastic bag, from the first hem seal across the grab-zone of the first multi-layered sidewall thereby forming an extended hem skirt; and a hem skirt seal positioned below the first hem seal that secures the extended hem skirt to the first multi-layered sidewall;

wherein the at least a portion of the fold-over of the first multi-layered sidewall forming the extended hem skirt comprises only one layer of the first multi-layered sidewall that is secured to an inside surface of the inner second thermoplastic bag by both the hem seal and the hem skirt seal.

2. The reinforced thermoplastic bag of claim 1, wherein the first multi-layered sidewall comprises a first outer layer and a second inner layer.

3. The reinforced thermoplastic bag of claim 2, wherein the portion of the fold-over of the first multi-layered sidewall forming the extended hem skirt comprises one of the first outer layer.

4. The reinforced thermoplastic bag of claim 2, wherein the portion of the fold-over of the first multi-layered sidewall forming the extended hem skirt comprises the second inner layer.

5. The reinforced thermoplastic bag of claim 2, wherein at least one of the first outer layer or the second inner layer is ring-rolled in a transverse direction perpendicular to the bottom fold.

6. The reinforced thermoplastic bag of claim 2, wherein the first outer layer comprises a first material and the second inner layer comprises a second material different from the first material.

7. The reinforced thermoplastic bag of claim 2, wherein:

the first outer layer comprises a first color;

the second inner layer comprises a second color; and at least a portion of the extended hem skirt comprises a third color differing from the first and second colors.

8. The reinforced thermoplastic bag of claim 1, further comprising one or more additional hem skirt seals that secure the extended hem skirt to the first multi-layered sidewall.

9. The reinforced thermoplastic bag of claim 1, wherein the hem skirt seal comprises a patterned seal.

10. The reinforced thermoplastic bag of claim 1, wherein the hem skirt seal secures the portion of the fold-over to the first multi-layered sidewall via a process selected from the group consisting of adhesive bonding, ultrasonic bonding, thermal bonding, embossing, ring rolling, SELFing, pressure in combination with tackifying agents embedded in one or more films of the first multi-layered sidewall, and combinations thereof.

11. A multi-layer thermoplastic bag comprising:

an outer first thermoplastic bag comprising first and second opposing sidewalls joined together along a first side edge, an opposite second side edge, an open first top edge, and a closed first bottom edge;

an inner second thermoplastic bag positioned within the first thermoplastic bag, the second thermoplastic bag comprising third and fourth opposing sidewalls joined together along a third side edge, an opposite fourth side edge, an open second top edge, and a closed second bottom edge, wherein a hem seal secures a fold-over of the outer first thermoplastic bag and the inner second thermoplastic bag forming a hem channel;

wherein the outer first thermoplastic bag and the inner second thermoplastic bag each comprise a grab-zone extending from the first and third side edges to the opposite second and fourth side edges and from the hem seal a first distance toward the first and second closed bottom edges;

wherein at least a portion of the fold-over of the outer first thermoplastic bag and the inner second thermoplastic bag extends from the hem seal across the grab-zone over an inside surface of the inner second thermoplastic bag thereby forming an extended hem skirt; and a hem skirt seal positioned below the hem seal that secures the extended hem skirt to the inside surface of the second thermoplastic bag;

wherein the portion of the fold-over of the outer first thermoplastic bag and the inner second thermoplastic bag forming the extended hem skirt comprises only one of the outer first thermoplastic bag or the inner second thermoplastic bag, which is secured to the inside surface of the inner second thermoplastic bag by both the hem seal and the hem skirt seal.

12. The multi-layer thermoplastic bag of claim 11, wherein the outer first thermoplastic bag or the inner second thermoplastic bag not forming the extended hem skirt ends between the hem seal and the hem skirt seal.

13. The multi-layer thermoplastic bag of claim 11, wherein both the outer first thermoplastic bag and the inner second thermoplastic bag are secured to the inside surface of the inner second thermoplastic bag by the hem seal.

14. The multi-layer thermoplastic bag of claim 11, wherein the portion of the fold-over of the outer first thermoplastic bag or the inner second thermoplastic bag forming the extended hem skirt is ring-rolled in a transverse direction perpendicular to a machine direction.

15. The multi-layer thermoplastic bag of claim 11, further comprising a draw tape disposed within the hem channel.

16. The multi-layer thermoplastic bag of claim 11, wherein the hem skirt seal forms a second hem channel at least partially closed by one or more layers of the extended hem skirt and the inside surface of the inner second thermoplastic bag.

17. The multi-layer thermoplastic bag of claim 11, wherein the extended hem skirt comprises one or more visual features distinct from at least one of the outer first thermoplastic bag or the inner second thermoplastic bag.

18. The multi-layer thermoplastic bag of claim 17, wherein the one or more visual features of the extended hem skirt are at least partially visible through an outside surface of the outer first thermoplastic bag.

19. The reinforced thermoplastic bag of claim 1, wherein the first hem seal comprises a plurality of non-continuous bonds.

20. The multi-layer thermoplastic bag of claim 11, wherein one or more of the hem seal or the hem skirt seal comprises a plurality of non-continuous bonds.

* * * * *